(12) United States Patent
Wang et al.

(10) Patent No.: US 10,714,048 B2
(45) Date of Patent: Jul. 14, 2020

(54) FLEXIBLE DISPLAY DEVICE AND METHOD FOR DRIVING THE SAME

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Yangpeng Wang, Beijing (CN); Guoqiang Tang, Beijing (CN); Zhenhua Zhang, Beijing (CN); Xucong Wang, Beijing (CN); Yao Hu, Beijing (CN); Yingsong Xu, Beijing (CN); Weinan Dai, Beijing (CN); Hailing Li, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 0 days.

(21) Appl. No.: 16/235,080

(22) Filed: Dec. 28, 2018

(65) Prior Publication Data
US 2019/0295494 A1 Sep. 26, 2019

(30) Foreign Application Priority Data
Mar. 22, 2018 (CN) .......................... 2018 1 0240967

(51) Int. Cl.
*G09G 5/00* (2006.01)

(52) U.S. Cl.
CPC ......... *G09G 5/003* (2013.01); *G09G 2380/02* (2013.01)

(58) Field of Classification Search
CPC .......................... G09G 2380/02; G06F 1/1652
See application file for complete search history.

(56) References Cited

U.S. PATENT DOCUMENTS 9,391,286 B1 * 7/2016 Kwon ................. H01L 51/0097
9,691,996 B2 * 6/2017 Lee ...................... H01L 51/0097

* cited by examiner

*Primary Examiner* — Koosha Sharifi-Tafreshi
(74) *Attorney, Agent, or Firm* — Kinney & Lange, P.A.

(57) ABSTRACT

A flexible display device and a method for driving the same are provided. The flexible display device includes a main flexible display panel and an auxiliary flexible display panel stacked on the main flexible display panel. The main and auxiliary flexible display panels includes respective pluralities of main and auxiliary pixel units spaced apart from each other. Orthographic projections of the auxiliary pixel units onto the main flexible display panel overlap with the main pixel units. The main and/or auxiliary flexible display panels can be configured such that when the flexible display device is stretched, at least a part of an orthographic projection of each main/auxiliary pixel unit is arranged between two adjacent auxiliary/main pixel units of the other flexible display panel.

16 Claims, 32 Drawing Sheets

FLEXIBLE DISPLAY DEVICE AND METHOD FOR DRIVING THE SAME

REFERENCE TO RELATED APPLICATION

This application claims a priority to Chinese Patent Application No. 201810240967.5 filed on Mar. 22, 2018, the disclosures of which are incorporated in their entirety by reference herein.

TECHNICAL FIELD

The present disclosure relates to the field of display technology, and in particular, to a flexible display device and a method for driving the same.

BACKGROUND

Stretchable screens are a new technology with promising application prospects in the fields of wearable and automobile devices, and have become popular for the industry in recent years. When the amount of stretching in such a screen is large, however, the PPI of the screen (also known as the pixel density, indicating the number of pixels per inch) will drop drastically, and the quality of image can be seriously adversely affected.

SUMMARY

A flexible display device is provided in the present disclosure, including a main flexible display panel and at least one auxiliary flexible display panel stacked on the main flexible display panel. The main flexible display panel includes a plurality of main pixel units spaced apart from each other, and the auxiliary flexible display panel includes a plurality of auxiliary pixel units spaced apart from each other. Orthographic projections of the auxiliary pixel units onto the main flexible display panel overlap with the main pixel units. The main flexible display panel can be configured to, in the case that the flexible display device is stretched, enable at least a part of an orthographic projection of each main pixel unit of the main flexible display panel onto the auxiliary flexible display panel to be arranged between two adjacent auxiliary pixel units of the auxiliary flexible display panel. Alternatively or additionally, the auxiliary flexible display panel can be configured to, in the case that the flexible display device is stretched, enable at least a part of an orthographic projection of each auxiliary pixel unit of the auxiliary flexible display panel onto the main flexible display panel to be arranged between two adjacent main pixel units of the main flexible display panel.

Optionally, at least one of a main base substrate of the main flexible display panel and an auxiliary base substrate of the auxiliary flexible display panel has different elasticity moduli.

Optionally, the main base substrate includes at least two sub substrates spliced together in a first direction and having different elasticity moduli, and/or the auxiliary base substrate includes at least two sub substrates spliced together in a second direction and having different elasticity moduli, where the first direction is perpendicular to the second direction.

Optionally, a splicing seam between the sub substrates of the main base substrate and a splicing seam between the sub substrates of the auxiliary base substrate are both arranged at a non-display region of the flexible display device.

Optionally, the main flexible display panel is arranged at a display side of the auxiliary flexible display panel, and the auxiliary flexible display panel is configured to be switched between a non-display state and a display state. In the case that at least a part of the orthographic projection of each auxiliary pixel unit of the auxiliary flexible display panel onto the main flexible display panel is arranged between two adjacent main pixel units of the main flexible display panel, the auxiliary flexible display panel is in the display state. In the case that the orthographic projection of each auxiliary pixel unit of the auxiliary flexible display panel onto the main flexible display panel is arranged within each main pixel unit of the main flexible display panel, the auxiliary flexible display panel is in the non-display state. A light transmitting region is arranged between two adjacent main pixel units of the main flexible display panel.

Optionally, in the case that an overlapping area of the orthographic projection of each auxiliary pixel unit of the auxiliary flexible display panel onto the main flexible display panel and the main pixel unit is less than or equal to a half of an area of the auxiliary pixel unit, the auxiliary flexible display panel is in the display state; in the case that the overlapping area of the orthographic projection of each auxiliary pixel unit of the auxiliary flexible display panel onto the main flexible display panel and the main pixel unit is greater than a half of the area of the auxiliary pixel unit, the auxiliary flexible display panel is in the non-display state.

Optionally, the main base substrate of the main flexible display panel includes a first main sub substrate and a second main sub substrate spliced together in the first direction, and the auxiliary base substrate of the auxiliary flexible display panel includes a first auxiliary sub substrate and a second auxiliary sub substrate spliced together in the first direction. A splicing seam between the first main sub substrate and the second main sub substrate and a splicing seam between the first auxiliary sub substrate and the second auxiliary sub substrate are respectively arranged at two opposite sides of the flexible display device in the first direction.

Optionally, the main base substrate of the main flexible display panel includes a first main sub substrate and a second main sub substrate spliced together in the first direction, and/or the auxiliary base substrate of the auxiliary flexible display panel includes a first auxiliary sub substrate and a second auxiliary sub substrate spliced together in the first direction.

Optionally, the main base substrate of the main flexible display panel further includes a third main sub substrate spliced together with the first main sub substrate and the second main sub substrate in the second direction. The auxiliary base substrate of the auxiliary flexible display panel further includes a third auxiliary sub substrate spliced together with the first auxiliary sub substrate and the second auxiliary sub substrate in the second direction. A splicing seam between the third main sub substrate and the first main sub substrate and the second main sub substrate and a splicing seam between the third auxiliary sub substrate and the first auxiliary sub substrate and the second auxiliary sub substrate are respectively arranged at two opposite sides of the flexible display device in second first direction.

Optionally, the main base substrate of the main flexible display panel can include a first main sub substrate and a second main sub substrate spliced together in the first direction and a third main sub substrate spliced together with the first main sub substrate and the second main sub substrate in the second direction. Alternatively, the auxiliary base substrate of the auxiliary flexible display panel can include a first auxiliary sub substrate and a second auxiliary sub substrate spliced together in the first direction and a third auxiliary sub substrate spliced together with the first auxiliary sub substrate and the second auxiliary sub substrate in the second direction.

Optionally, the main base substrate of the main flexible display panel includes: a first main sub substrate and a second main sub substrate spliced together in the first direction and a third main sub substrate spliced together with the first main sub substrate and the second main sub substrate in the second direction. The auxiliary base substrate of the auxiliary flexible display panel can include a first auxiliary sub substrate and a second auxiliary sub substrate spliced together in the first direction, or a second auxiliary sub substrate and a third auxiliary sub substrate spliced together in the second direction.

Optionally, the auxiliary base substrate of the auxiliary flexible display panel includes: a first auxiliary sub substrate and a second auxiliary sub substrate spliced together in the first direction and a third auxiliary sub substrate spliced together with the first auxiliary sub substrate and the second auxiliary sub substrate in the second direction. The main base substrate of the main flexible display panel can include a first main sub substrate and a second main sub substrate spliced together in the first direction, or a first main sub substrate and a third main sub substrate spliced together in the second direction.

Optionally, the main base substrate of the main flexible display panel includes: a first main sub substrate and a second main sub substrate spliced together in the first direction. The auxiliary base substrate of the auxiliary flexible display panel includes: a second auxiliary sub substrate and a third auxiliary sub substrate spliced together in the second direction.

Optionally, first signal receiver and a second signal receiver are arranged on the main flexible display panel in the first direction, and a signal transmitter is arranged on the auxiliary flexible display panel, where the signal transmitter is configured to transmit a first instruction signal and a second instruction signal, the first signal receiver is configured to receive the first instruction signal, and the second signal receiver is configured to receive the second instruction signal. The signal transmitter is configured to transmit the first instruction signal in the case that the orthographic projections of the auxiliary pixel units onto the main flexible display panel completely overlap with the main pixel units and an orthographic projection of the signal transmitter onto the main flexible display panel overlaps with the first signal receiver; the first signal receiver is configured to receive the first instruction signal sent by the signal transmitter and transmit the first instruction signal to a control circuit of the auxiliary flexible display panel; the control circuit of the auxiliary flexible display panel is configured to control the auxiliary flexible display panel to be in a non-display state in response to the first instruction signal. In the case that the flexible display device is stretched and the orthographic projection of the signal transmitter onto the main flexible display panel does not overlap with the first signal receiver and the second signal receiver, the first signal receiver and the second signal receiver are unable to receive the first instruction signal and the second instruction signal transmitted by the signal transmitter; the control circuit of the auxiliary flexible display panel is configured to control the auxiliary flexible display panel to be in a first display state, where in the first display state, the orthographic projection of the auxiliary pixel unit onto the main flexible display panel overlaps with at least one main pixel unit, and the auxiliary pixel unit and the at least one main pixel unit have the same display gray scale. The signal transmitter is further configured to transmit the second instruction signal in the case that the orthographic projection of the signal transmitter onto the main flexible display panel overlaps with the second signal receiver; the second signal receiver is configured to receive the second instruction signal sent by the signal transmitter and transmit the second instruction signal to the control circuit of the auxiliary flexible display panel; the control circuit of the auxiliary flexible display panel is configured to control the auxiliary flexible display panel to be in a second display state in response to the second instruction signal, where in the second display state, the orthographic projection of the auxiliary pixel unit onto the main flexible display panel does overlap with the main pixel unit, and the auxiliary pixel unit and the main pixel unit have the same or different display gray scales.

Optionally, a first signal receiver and a second signal receiver are arranged on the main flexible display panel in the first direction, and a first signal transmitter is arranged on the auxiliary flexible display panel; a third signal receiver and a fourth signal receiver are arranged on the main flexible display panel in the second direction, and a second signal transmitter is arranged on the auxiliary flexible display panel, where the first signal transmitter is configured to transmit a first instruction signal and a second instruction signal and the second signal transmitter is configured to transmit a third instruction signal and a fourth instruction signal; the first signal receiver is configured to receive the first instruction signal, the second signal receiver is configured to receive the second instruction signal, the third signal receiver is configured to receive the third instruction signal, and the fourth signal receiver is configured to receive the fourth instruction signal. The first signal transmitter is configured to transmit the first instruction signal in the case that the orthographic projections of the auxiliary pixel units onto the main flexible display panel completely overlap with the main pixel units and an orthographic projection of the first signal transmitter onto the main flexible display panel overlaps with the first signal receiver; the second signal transmitter is configured to transmit the third instruction signal in the case that the orthographic projections of the auxiliary pixel units onto the main flexible display panel completely overlap with the main pixel units and an orthographic projection of the second signal transmitter onto the main flexible display panel overlaps with the third signal receiver; the first signal receiver is configured to receive the first instruction signal sent by the first signal transmitter and transmit the first instruction signal to a control circuit of the auxiliary flexible display panel, and the third signal receiver is configured to receive a third instruction signal sent by the second signal transmitter and transmit the third instruction signal to the control circuit of the auxiliary flexible display panel; the control circuit of the auxiliary flexible display panel is configured to control the auxiliary flexible display panel to be in a non-display state in response to the first instruction signal and/or the third instruction signal. In the case that the flexible display device is stretched and the orthographic projection of the first signal transmitter onto the main flexible display panel does not overlap with the first signal receiver and the second signal receiver, the first signal receiver and the second signal receiver are unable to receive the first instruction signal and the second instruction signal transmitted by the first signal transmitter; in the case that the orthographic projection of the second signal transmitter onto the main flexible display panel does not overlap with the third signal receiver and the fourth signal receiver, the third signal receiver and the fourth signal receiver are unable to receive the third instruction signal and the fourth instruction signal transmitted by the second signal transmitter; the control circuit of the auxiliary flexible display panel is configured to control the auxiliary flexible display panel to be in a first display state, where in the first display state, the orthographic projection of the auxiliary pixel unit onto the main flexible display panel overlaps with at least one main pixel unit, and the auxiliary pixel unit and the at least one main pixel unit have the same display gray scale. The first signal transmitter is further configured to transmit the second instruction signal in the case that the orthographic projection of the first signal transmitter onto the main flexible display panel overlaps with the second signal receiver, and the second signal receiver is configured to receive the second instruction signal sent by the first signal transmitter and transmit the second instruction signal to the control circuit of the auxiliary flexible display panel; the second signal transmitter is further configured to transmit the fourth instruction signal in the case that the orthographic projection of the second signal transmitter onto the main flexible display panel overlaps with the fourth signal receiver, and the fourth signal receiver is configured to receive the fourth instruction signal sent by the second signal transmitter and transmit the fourth instruction signal to the control circuit of the auxiliary flexible display panel; the control circuit of the auxiliary flexible display panel is configured to control the auxiliary flexible display panel to be in a second display state in response to the second instruction signal and/or the fourth instruction signal, where in the second display state, the orthographic projection of the auxiliary pixel unit onto the main flexible display panel does not overlap with the main pixel unit, and the auxiliary pixel unit and the main pixel unit have the same or different display gray scales.

A method for driving the above flexible display device is further provided in the present disclosure, including: controlling the auxiliary flexible display panel to be in a display state, in the case that at least a part of the orthographic projection of each auxiliary pixel unit of the auxiliary flexible display panel onto the main flexible display panel is arranged between two adjacent main pixel units of the main flexible display panel; controlling the auxiliary flexible display panel to be in a non-display state, in the case that the orthographic projection of each auxiliary pixel unit of the auxiliary flexible display panel onto the main flexible display panel is arranged within each main pixel unit of the main flexible display panel.

A method for driving the above flexible display device is further provided in the present disclosure, including: in the case that the flexible display device is stretched and the orthographic projection of the signal transmitter onto the main flexible display panel does not overlap with the first signal receiver and the second signal receiver, the control circuit of the auxiliary flexible display panel controlling the auxiliary flexible display panel to be in a first display state, where in the first display state, the orthographic projection of the auxiliary pixel unit onto the main flexible display panel overlaps with at least one main pixel unit, and the auxiliary pixel unit and the at least one main pixel unit have the same display gray scale; in the case that the orthographic projection of the signal transmitter onto the main flexible display panel overlaps with the second signal receiver, the signal transmitter transmitting the second instruction signal, the second signal receiving the second instruction signal sent by the signal transmitter and transmitting the second instruction signal to the control circuit of the auxiliary flexible display panel, the control circuit of the auxiliary flexible display panel controlling the auxiliary flexible display panel to be in a second display state in response to the second instruction signal, where in the second display state, the orthographic projection of the auxiliary pixel unit onto the main flexible display panel does overlap with the main pixel unit, and the auxiliary pixel unit and the main pixel unit have the same or different display gray scales. The method further includes: in the case that the orthographic projections of the auxiliary pixel units onto the main flexible display panel completely overlap with the main pixel units and an orthographic projection of the signal transmitter onto the main flexible display panel overlaps with the first signal receiver, the signal transmitter transmitting the first instruction signal, the first signal receiver receiving the first instruction signal sent by the signal transmitter and transmitting the first instruction signal to the control circuit of the auxiliary flexible display panel, and the control circuit of the auxiliary flexible display panel controlling the auxiliary flexible display panel to be in the non-display state in response to the first instruction signal.

A method for driving the above flexible display device is further provided in the present disclosure, including: in the case that the flexible display device is stretched and the orthographic projection of the first signal transmitter onto the main flexible display panel does not overlap with the first signal receiver and the second signal receiver and the orthographic projection of the second signal transmitter onto the main flexible display panel does not overlap with the third signal receiver and the fourth signal receiver, the control circuit of the auxiliary flexible display panel controlling the auxiliary flexible display panel to be in a first display state, where in the first display state, the orthographic projection of the auxiliary pixel unit onto the main flexible display panel overlaps with at least one main pixel unit, and the auxiliary pixel unit and the at least one main pixel unit have the same display gray scale; in the case that the orthographic projection of the first signal transmitter onto the main flexible display panel overlaps with the second signal receiver, the first signal transmitter transmitting the second instruction signal, and the second signal receiving the second instruction signal sent by the first signal transmitter and transmitting the second instruction signal to the control circuit of the auxiliary flexible display panel; in the case that the orthographic projection of the second signal transmitter onto the main flexible display panel overlaps with the fourth signal receiver, the second signal transmitter transmitting the fourth instruction signal and the fourth signal receiver receiving the fourth instruction signal sent by the second signal transmitter and transmitting the fourth instruction signal to the control circuit of the auxiliary flexible display panel; the control circuit of the auxiliary flexible display panel controlling the auxiliary flexible display panel to be in a second display state in response to the second instruction signal and/or the fourth instruction signal, where in the second display state, the orthographic projection of the auxiliary pixel unit onto the main flexible display panel does overlap with the main pixel unit, and the auxiliary pixel unit and the main pixel unit have the same or different display gray scales. The method further includes: in the case that the orthographic projections of the auxiliary pixel units onto the main flexible display panel completely overlap with the main pixel units and an orthographic projection of the first signal transmitter onto the main flexible display panel overlaps with the first signal receiver and an orthographic projection of the second signal transmitter onto the main flexible display panel overlaps with the third signal receiver, the first signal transmitter transmitting the first instruction signal and the first signal receiver receiving the first instruction signal sent by the first signal transmitter and transmit the first instruction signal to the control circuit of the auxiliary flexible display panel; the second signal transmitter transmitting the third instruction signal, the third signal receiver receiving the third instruction signal sent by the second signal transmitter and transmitting the third instruction signal to the control circuit of the auxiliary flexible display panel; and the control circuit of the auxiliary flexible display panel controlling the auxiliary flexible display panel to be in a non-display state in response to the first instruction signal and/or the third instruction signal.

BRIEF DESCRIPTION OF THE DRAWINGS

The embodiments of the present disclosure will be further described in detail below in conjunction with drawings.

Figure 1:
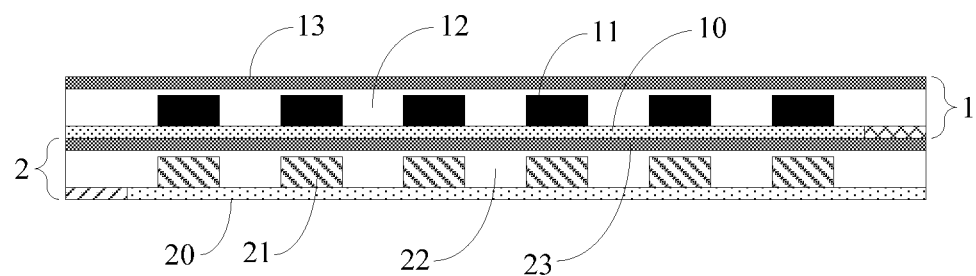
FIG. 1 is a sectional view of a flexible display device in an unstretched state in some embodiments of the present disclosure.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In order to further describe the flexible display device and the method for driving the same provided by the embodiments of the present disclosure, a detailed description will be provided below with reference to the drawings.

Figure 2:
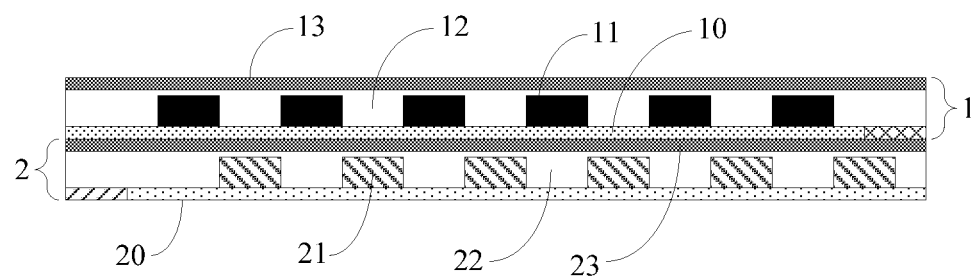
FIG. 2 is a sectional view of a flexible display device in a stretched state in some embodiments of the present disclosure.

Referring to FIG. 1 and FIG. 2, a flexible display device in some embodiments of the present disclosure includes: a main flexible display panel 1 and at least one auxiliary flexible display panel 2 arranged in a stacked manner. After stretching the flexible display device, orthographic projections of the auxiliary pixel units 21 of the auxiliary flexible display panel 2 onto the main flexible display panel 1 do not completely overlap with any one of the main pixel units 11 of the main flexible display panel 1.

Figure 3:
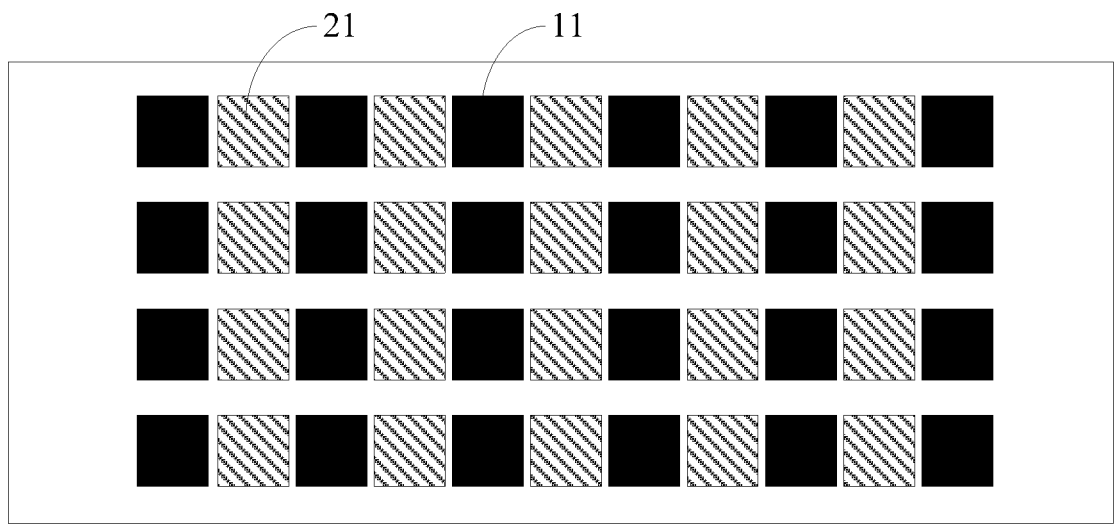
FIG. 3 is a plan view of a flexible display device in a stretched state in some embodiments of the present disclosure.

When the flexible display device is in an actual application, before being stretched, as shown in FIG. 1, the orthographic projections of the plurality of auxiliary pixel units 21 onto the main flexible display panel 1 completely overlap with the plurality of main pixel units 11. When the flexible display device is in the display state, the main flexible display panel 1 is controlled to be in the display state, and the auxiliary flexible display panel 2 is controlled to be in the non-display state, thereby preventing the auxiliary flexible display panel 2 from interfering with the display of the main flexible display panel 1, to ensure that the flexible display device can achieve the normal display function. As shown in FIGS. 2 and 3, after stretching the flexible display device, the plurality of main pixel units 11 on the main flexible display panel 1 and the plurality of auxiliary pixel units 21 on the auxiliary flexible display panel 2 are misaligned, so that the orthographic projections of the plurality of auxiliary pixel units 21 onto the main flexible display panel 1 do not completely overlap with the plurality of main pixel units 11, and the auxiliary flexible display panel 2 can be controlled to be in a display state, so that light emitted from the auxiliary flexible display panel 2 may be transmitted to the display side of the flexible display device through the light-transmitting region between the adjacent main pixel units 11, and the user may see the image displayed by the main flexible display panel 1 together with the auxiliary flexible display panel 2.

It should be noted that, the above stretching for the flexible display device includes: plane stretching and/or curved stretching.

According to the structure and the actual working process of the flexible display device hereinabove, the flexible display device in some embodiments of the present disclosure includes the main flexible display panel 1 and the at least one auxiliary flexible display panel 2 arranged in a stacked manner. After the device is stretched, the auxiliary pixel units 21 of the auxiliary flexible display panel 2 are misaligned with the main pixel unit 11 of the main flexible display panel 1, so that the orthographic projections of the plurality of auxiliary pixel units 21 of the auxiliary flexible display panel 2 onto the main flexible display panel 1 do not completely overlap with the plurality of main pixel units 11. The orthographic projection on the display panel 1 do not completely overlap with any one of the main pixel units 11 of the main flexible display panel 1, that is, the auxiliary pixel unit 21 is arranged at the light transmitting region between the adjacent main pixel units 11, thereby improving the number of pixel units per inch in the flexible display device after being stretched, and then ensuring the display effect of the flexible display device by controlling the main flexible display panel 1 and the auxiliary flexible display panel 2 to be in a display state.

It should be noted that, when the flexible display device is actually stretched, there are various stretching conditions, for example, the auxiliary pixel unit is just stretched to a position between adjacent main pixel units, that is, after the flexible display device is stretched, the orthographic projection of the auxiliary pixel unit onto the main flexible display panel do not overlap with any one of the main pixel units; or after the flexible display device is stretched, the orthographic projection of the auxiliary pixel unit onto the main flexible display panel partially overlaps with the main pixel unit. In either case, when controlling the display of the flexible display device, the control chip in the flexible display device may control each main pixel unit and each auxiliary pixel unit to display corresponding images respectively based on the distribution of the main pixel units and the auxiliary pixel units, thereby ensuring the final display effect of the flexible display device. In addition, it should be noted that when the flexible display device is actually manufactured, due to the limitation of the manufacturing process, it is difficult to make the orthographic projections of the plurality of auxiliary pixel units 21 onto the main flexible display panel 1 to completely overlap with the plurality of main pixel units 11.

In addition, in the flexible display device in some embodiments of the present disclosure, one or more auxiliary flexible display panels 2 may be arranged as needed, and the display of each auxiliary flexible display panel 2 is appropriately controlled by the control chip.

Furthermore, the main flexible display panel 1 is arranged at the display side of the auxiliary flexible display panel 2, and the auxiliary flexible display panel 2 is switchable between the non-display state and the display state. When the orthographic projections of the auxiliary pixel units 21 onto the main flexible display panel 1 do not completely overlap with any one of the main pixel units 11, the auxiliary flexible display panel 2 is in the display state, otherwise the auxiliary flexible display panel 2 is in the non-display state. When the auxiliary flexible display panel 2 is in the display state, a light transmitting region is arranged between adjacent main pixel units 11 of the main flexible display panel 1.

To be specific, the auxiliary flexible display panel 2 includes a display side and a non-display side, where the display side of the auxiliary flexible display panel 2 refers to a side from which an image displayed by the auxiliary flexible display panel 2 can be observed. The main flexible display panel 1 includes a display side and a non-display side, the display side of the main flexible display panel 1 refers to a side from which an image displayed by the main flexible display panel 1 can be observed. The display side of the flexible display device is the display side of the main flexible display panel 1. In addition, a light-transmitting region may be arranged between adjacent main pixel units of the main flexible display panel 1, so that light emitted by the auxiliary pixel unit 21 can be better transmitted through the main flexible display panel 1.

Furthermore, in the case that an overlapping area of the orthographic projection of each auxiliary pixel unit 21 of the auxiliary flexible display panel 2 onto the main flexible display panel 1 and the main pixel unit 11 is less than or equal to a half of an area of the auxiliary pixel unit 21, the auxiliary flexible display panel 2 is in the display state; otherwise, the auxiliary flexible display panel 2 is in the non-display state.

Specifically, in the case that an overlapping area of the orthographic projection of each auxiliary pixel unit 21 of the auxiliary flexible display panel 2 onto the main flexible display panel 1 and the main pixel unit 11 is less than or equal to a half of an area of the auxiliary pixel unit 21, the auxiliary flexible display panel 2 is controlled to be in the display state, so that not only the display effect of the flexible display device may be ensured, but also the calculation amount of the control chip in the flexible display device may be reduced, and the power consumption of the flexible display device may be reduced.

Furthermore, at least one of the main base substrate of the main flexible display panel 1 and the auxiliary base substrate of the auxiliary flexible display panel 2 has different elasticity moduli.

Specifically, at least one of the main base substrate of the main flexible display panel 1 and the auxiliary base substrate of the auxiliary flexible display panel 2 has different elasticity moduli, so that when the flexible display device is stretched, the portions of the base substrate respectively having different elastic moduli may be stretched to different degrees, so that the auxiliary pixel units 21 of the auxiliary flexible display panel 2 may be misaligned with the main pixel units 11 of the main flexible display panel 1, so as to enable the orthographic projections of the auxiliary pixel unit 21 of the flexible display panel 2 onto the main flexible display panel 1 not completely overlap with any one of the main pixel units 11 of the main flexible display panel 1.

It is to be noted that, in the flexible display device provided by the above embodiment, the description of including the main flexible display panel and the at least one auxiliary flexible display panel arranged in a stacked manner is merely a description, and other situations may exist, for example, the flexible display device may only have one display panel including at least two base substrates and pixel units arranged on the respective base substrates, and at least one of the at least two base substrates has different elasticity moduli. Therefore, when the flexible display panel is stretched, the pixel units of different base substrates may also be misaligned with each other.

Furthermore, the above base substrate having different elastic moduli includes at least two sub substrates spliced together and having different elastic moduli.

Specifically, the above base substrate having different elastic moduli may be realized, for example, by splicing together at least two sub substrates having different elastic moduli, but the present disclosure is not limited herein.

Furthermore, in a substrate having different elastic moduli, a splicing seam between the sub substrates is arranged at a non-display region of the flexible display device.

Specifically, when the above base substrate having different elastic moduli is formed by splicing together at least two sub substrates having different elastic moduli, the splicing seam between the sub substrates may be arranged at a display region or a non-display region of the flexible display device. Optionally, the splicing seam is arranged at a non-display region of the flexible display device. The splicing seam between the sub substrates is arranged at the non-display region of the flexible display device, so that when the main flexible display panel includes the base substrates spliced together, all the main pixel units of the main flexible display panel may be arranged on the sub substrate having an identical elastic modulus. Therefore, when stretching the flexible display device, the main pixel units of the main flexible display panel may be uniformly stretched, and the distance between the main pixel units may be uniformly changed, which is advantageous for achieving uniformity of the flexible display device. Similarly, when the auxiliary flexible display panel includes the base substrates spliced together, all the auxiliary pixel units of the auxiliary flexible display panel may be arranged on the sub substrate having an identical elastic modulus. Therefore, when stretching the flexible display device, the auxiliary pixel units of the auxiliary flexible display panel may be uniformly stretched, and the distance between the auxiliary pixel units may be uniformly changed, which is advantageous for achieving uniformity of the flexible display device.

The specific splicing structures of the base substrate will be described below.

Figure 4A:
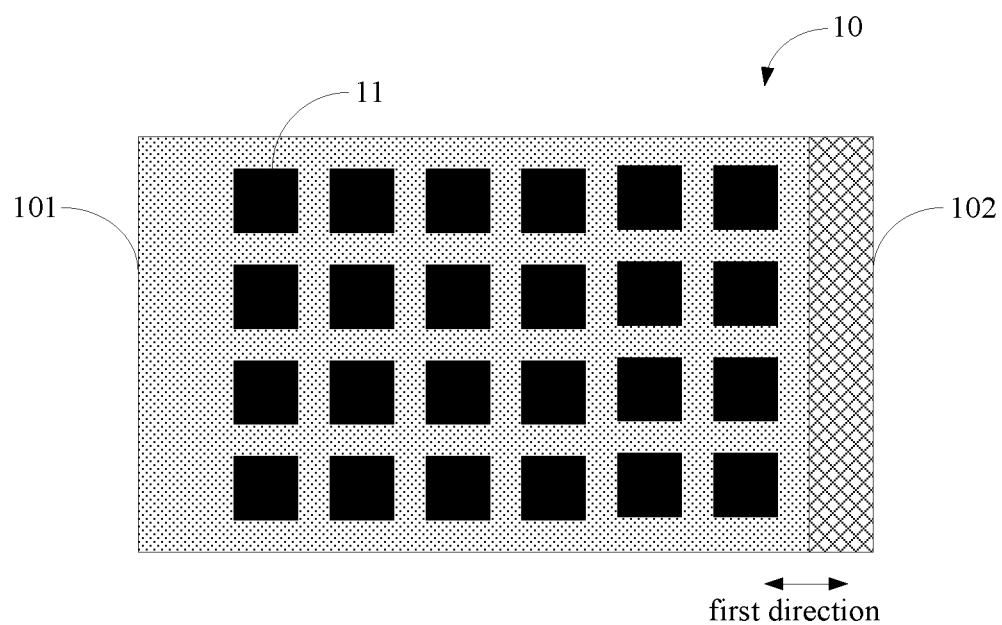
FIG. 4a is a schematic view of a main flexible display panel before being stretched in some embodiments of the present disclosure.
Figure 4B:
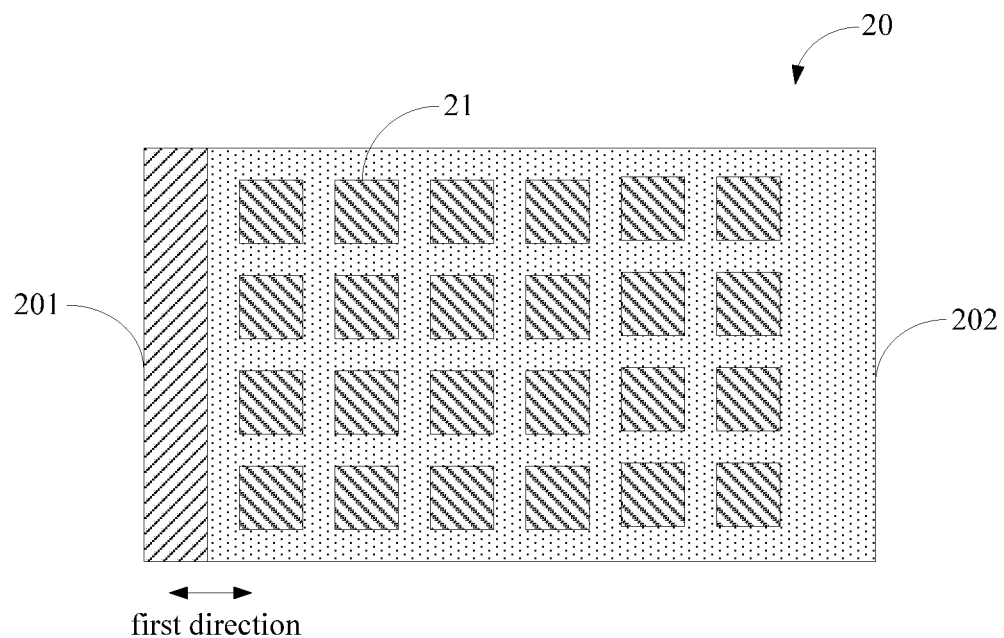
FIG. 4b is a schematic view of an auxiliary flexible display panel before being stretched in some embodiments of the present disclosure.
Figure 4C:
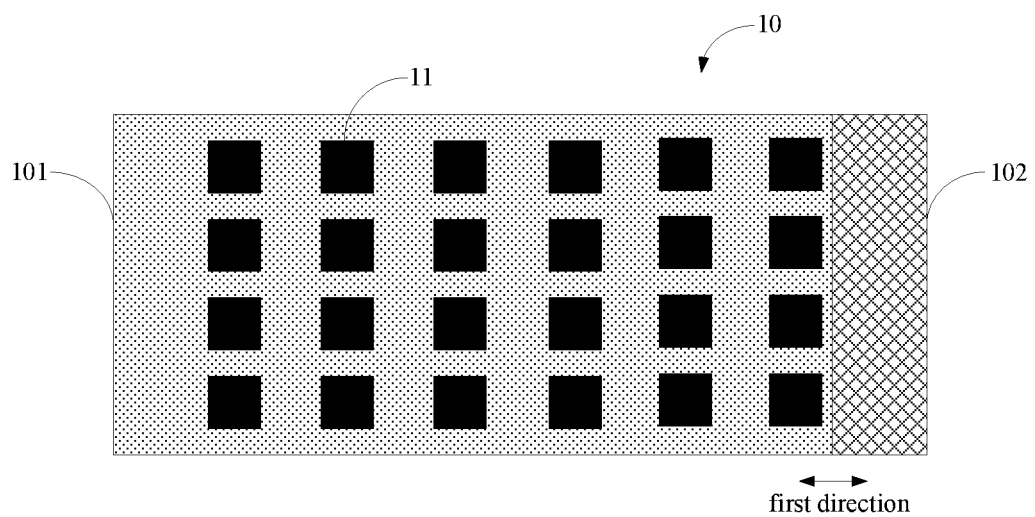
FIG. 4c is a schematic view of a main flexible display panel after being stretched in some embodiments of the present disclosure.
Figure 4D:
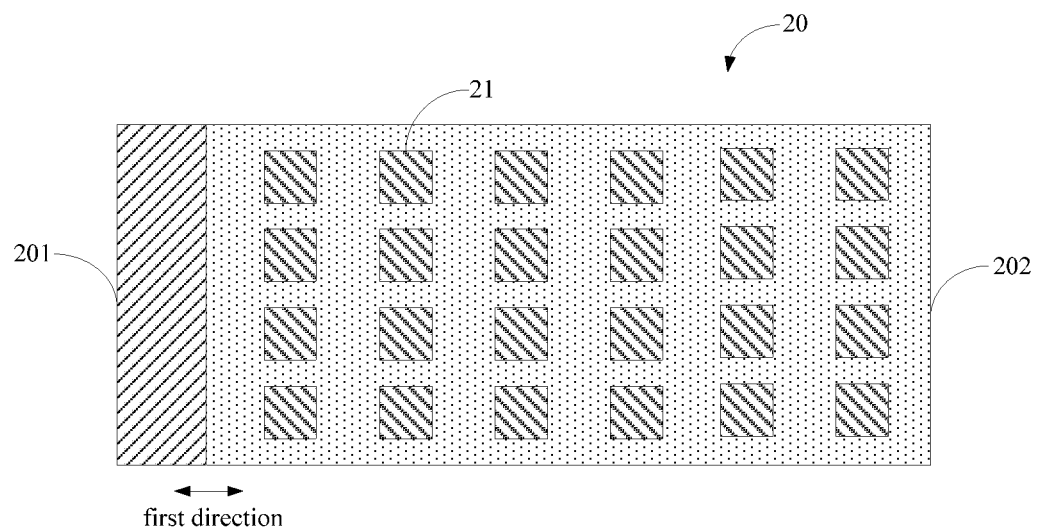
FIG. 4d is a schematic view of an auxiliary flexible display panel after being stretched in some embodiments of the present disclosure.

In some embodiments of the present disclosure, as shown in FIG. 4a and FIG. 4b, the main base substrate 10 of the main flexible display panel 1 includes: a first main sub substrate 101 and a second main sub substrate 102 spliced together in a first direction. The auxiliary base substrate 20 of the auxiliary flexible display panel 2 includes: a first auxiliary sub substrate 201 and a second auxiliary sub substrate 202 spliced together in a first direction. A splicing seam between the first main sub substrate 101 and the second main sub substrate 102 and the splicing seam between the first auxiliary sub substrate 201 and the second auxiliary sub substrate 202 are respectively arranged at opposite sides of the flexible display device in the first direction.

Specifically, since the first main sub substrate 101 and the second main sub substrate 102 have different elastic moduli, the first auxiliary sub substrate 201 and the second auxiliary sub substrate 202 have different elastic moduli, and the splicing seam between the two main sub substrates and the splicing seam between the two auxiliary sub substrates are respectively arranged at opposite sides of the flexible display device in the first direction, so that when the flexible display device is stretched in the first direction, as shown in FIGS. 4c, 4d, 2, and 3, the main pixel units 11 of the main flexible display panel 1 and the auxiliary pixel unit 21 of the auxiliary flexible display panel 2 are stretched and moved by different distances, and the main pixel units 11 and the auxiliary pixel units 21 may be misaligned with each other, so that the orthographic projections of the auxiliary pixel units 21 of the auxiliary flexible display panel 2 onto the main flexible display panel 1 do not completely overlap with any one of the main pixel units 11, thereby arranging the auxiliary pixel unit 21 between the adjacent main pixel units 11, improving the number of pixel units per inch in the flexible display device after being stretched, and ensuring the display effect of the flexible display device.

In some embodiments of the present disclosure, the main base substrate of the main flexible display panel comprises a first main sub substrate and a second main sub substrate spliced together in the first direction, or the auxiliary base substrate of the auxiliary flexible display panel comprises a first auxiliary sub substrate and a second auxiliary sub substrate spliced together in the first direction.

Figure 5A:
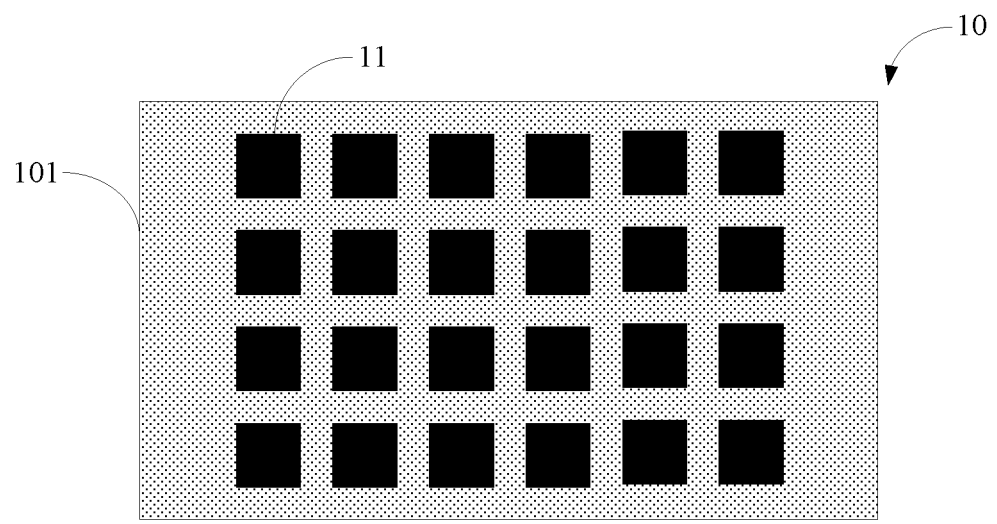
FIG. 5a is a schematic view of a main flexible display panel before being stretched in some embodiments of the present disclosure.
Figure 5B:
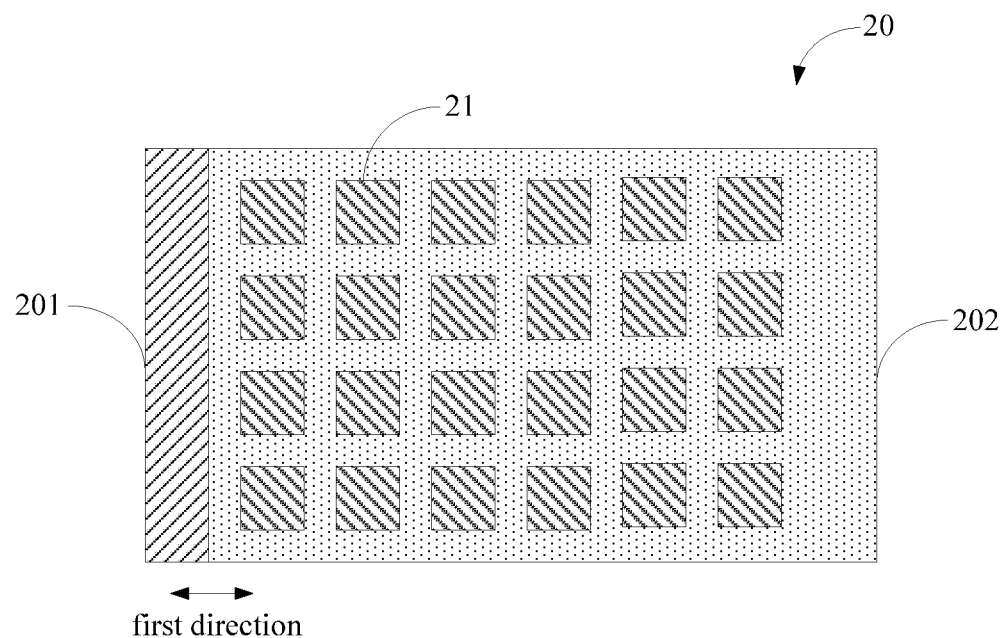
FIG. 5b is a schematic view of an auxiliary flexible display panel before being stretched in some embodiments of the present disclosure.
Figure 5C:
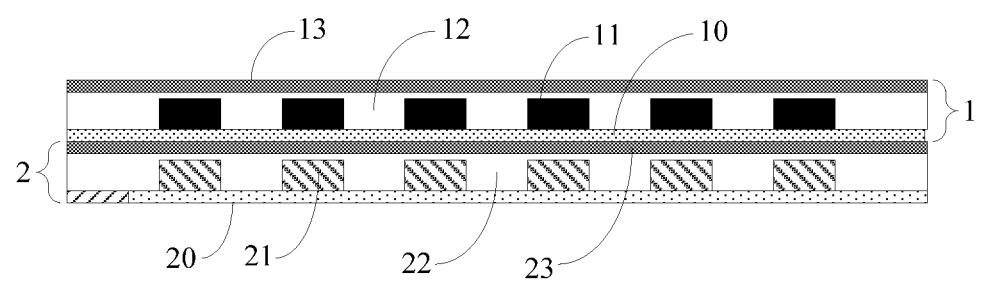
FIG. 5c is a sectional view of a flexible display device before being stretched in some embodiments of the present disclosure.

For example, as shown in FIG. 5a to FIG. 5c, the main base substrate 10 of the main flexible display panel 1 is a one-piece base substrate, and the auxiliary base substrate 20 of the auxiliary flexible display panel 2 includes the first auxiliary sub substrate 201 and the second auxiliary sub substrate 202 spliced together in the first direction.

Figure 5D:
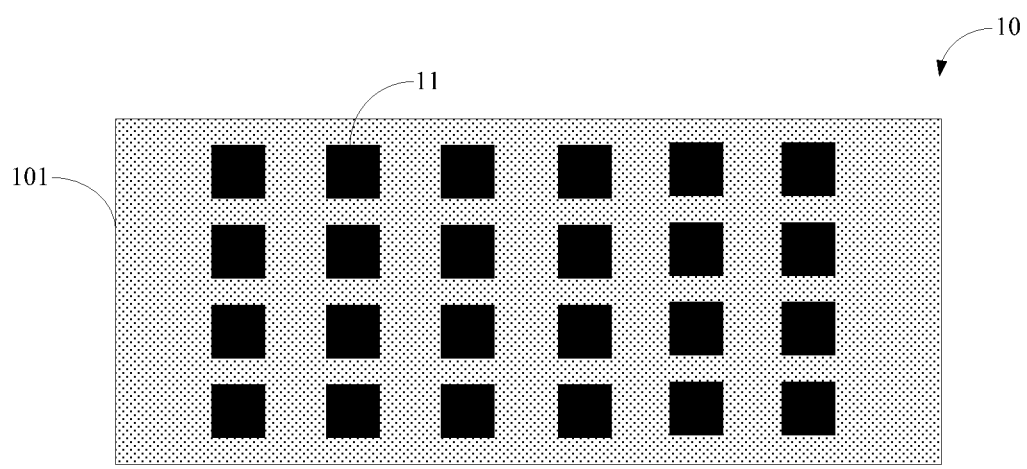
FIG. 5d is a schematic view of a main flexible display panel after being stretched in some embodiments of the present disclosure.
Figure 5E:
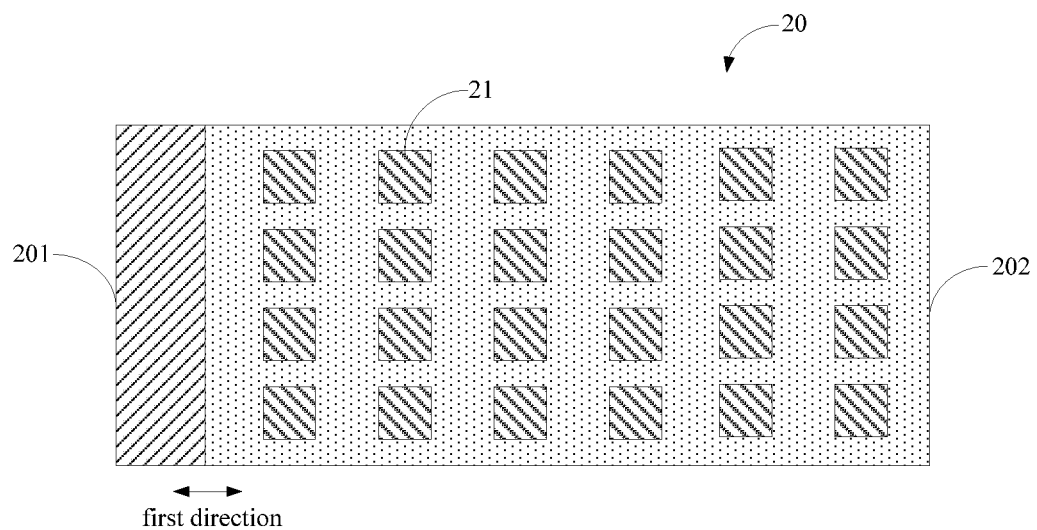
FIG. 5e is schematic view of an auxiliary flexible display panel after being stretched in some embodiments of the present disclosure.
Figure 5F:
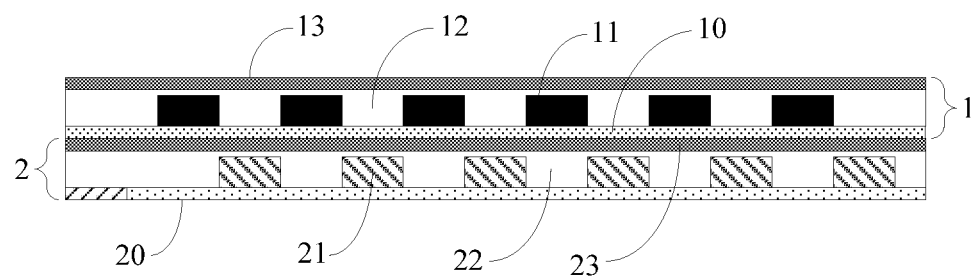
FIG. 5f is a sectional view of a flexible display device after being stretched in some embodiments of the present disclosure.

To be specific, when the flexible display device is stretched in the first direction, as shown in FIGS. 5d to 5f, the main pixel units 11 of the main flexible display panel 1 and the auxiliary pixel units 21 of the auxiliary flexible display panel 2 are stretched and moved by different distances.

Figure 6A:
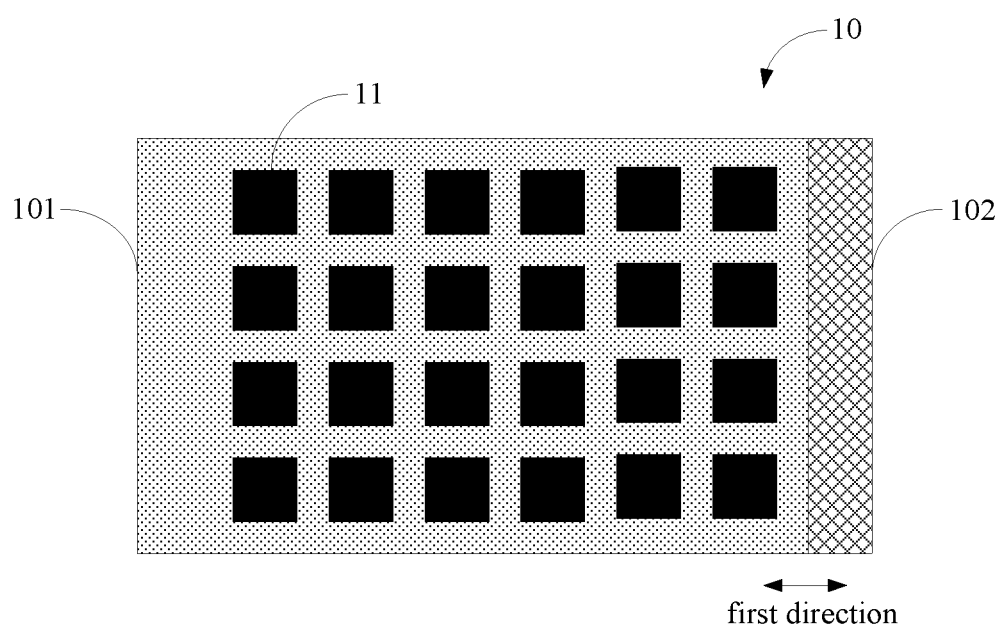
FIG. 6a is a schematic view of a main flexible display panel before being stretched in some embodiments of the present disclosure.
Figure 6B:
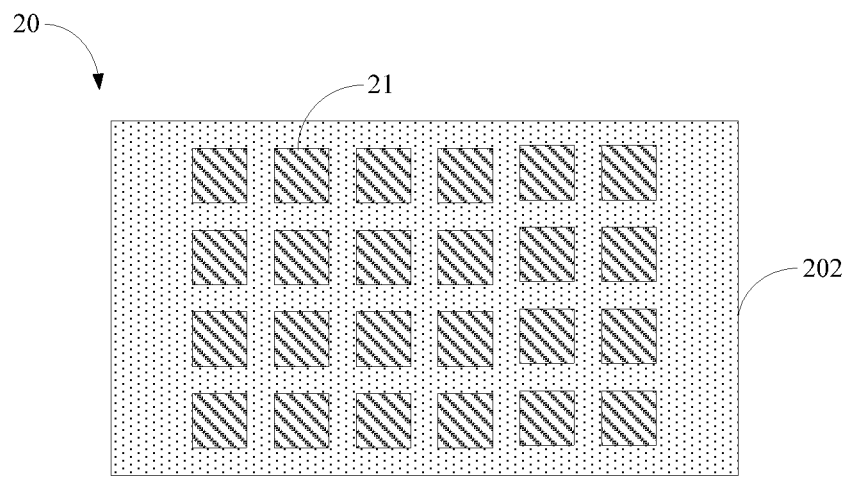
FIG. 6b is a schematic view of an auxiliary flexible display panel before being stretched in some embodiments of the present disclosure.
Figure 6C:
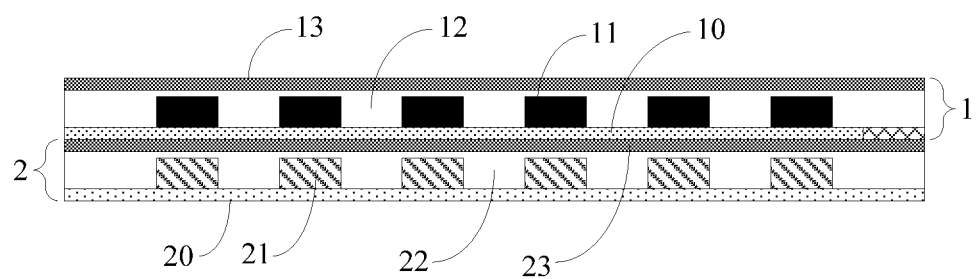
FIG. 6c is a sectional view of a flexible display device before being stretched in some embodiments of the present disclosure.

For example, as shown in FIG. 6a to FIG. 6c, the main base substrate 10 of the main flexible display panel 1 includes: a first main sub substrate 101 and a second main sub substrate 102 spliced together in the first direction, and the auxiliary base substrate 20 of the auxiliary flexible display panel 2 is a one-piece base substrate.

Figure 6D:
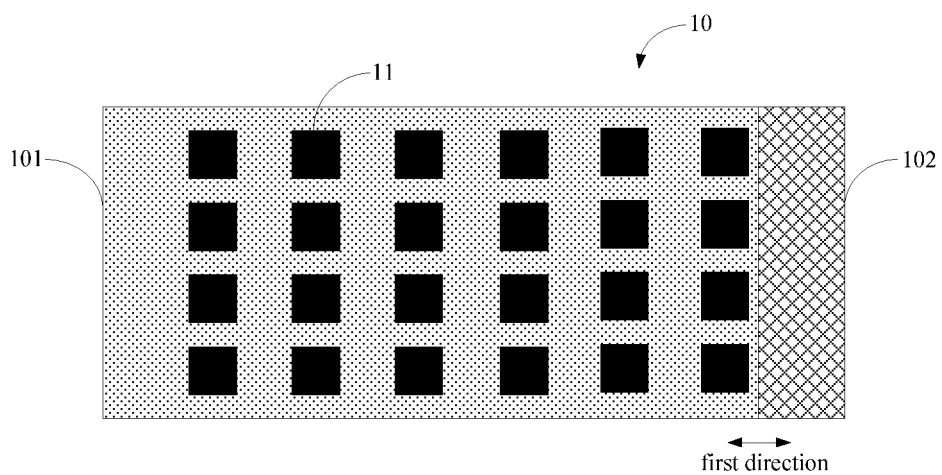
FIG. 6d is a schematic view of the main flexible display panel after being stretched in some embodiments of the present disclosure.
Figure 6E:
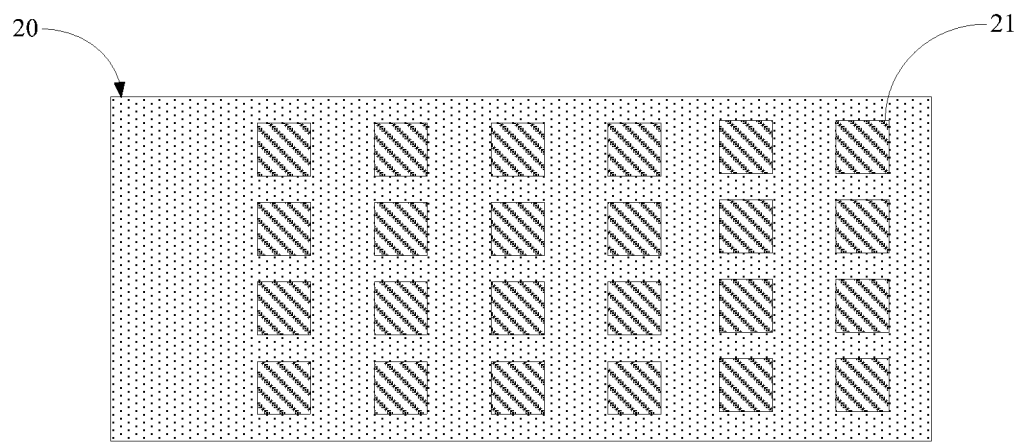
FIG. 6e is a schematic view of the auxiliary flexible display panel under the second splicing structure after stretching.
Figure 6F:
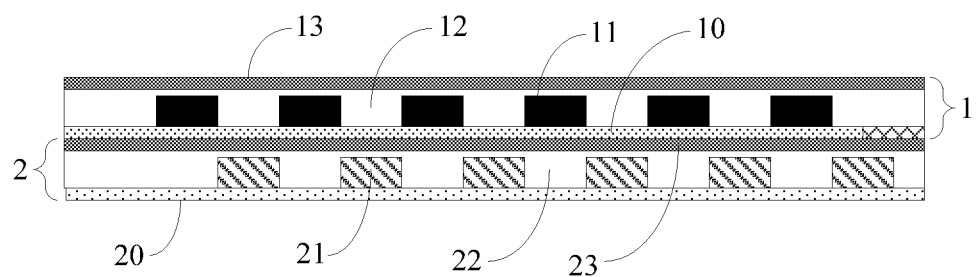
FIG. 6f is a sectional view of a flexible display device after being stretched in some embodiments of the present disclosure.

To be specific, when the flexible display device is stretched in the first direction, as shown in FIGS. 6d to 6f, the main pixel units 11 of the main flexible display panel 1 and the auxiliary pixel units 21 of the auxiliary flexible display panel 2 are stretched and moved by different distances.

When the base substrate of the flexible display device has the above splicing structures, the flexible display device may be controlled as follows.

Figure 7:
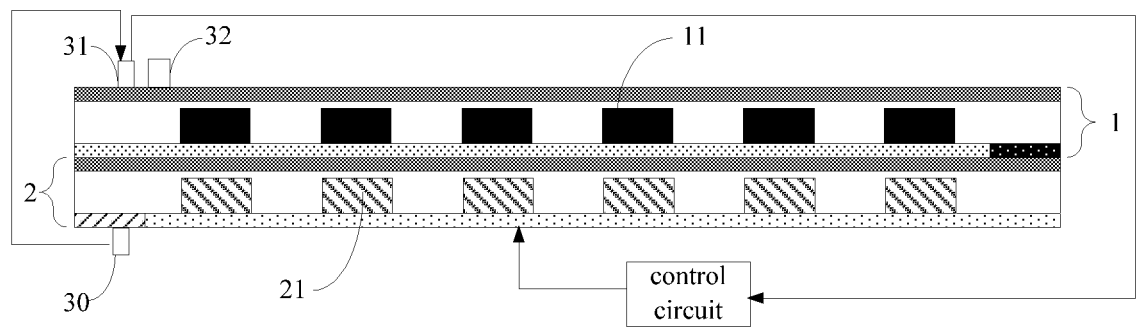
FIG. 7 is a schematic view of signal transmission when a signal transmitter overlaps with a first signal receiver.

Specifically, as shown in FIG. 7, a first signal receiver 31 and a second signal receiver 32 are arranged on the main flexible display panel 1 in the first direction, and a signal transmitter 30 is arranged on the auxiliary flexible display panel 2, where the signal transmitter 30 is configured to transmit a first instruction signal and a second instruction signal, the first signal receiver 31 is configured to receive the first instruction signal, and the second signal receiver 32 is configured to receive the second instruction signal. Before the flexible display device is stretched, the signal transmitter 30 is configured to transmit the first instruction signal in the case that the orthographic projections of the auxiliary pixel units 21 onto the main flexible display panel 1 completely overlap with the main pixel units 11 and an orthographic projection of the signal transmitter 30 onto the main flexible display panel 1 overlaps with the first signal receiver 31. The first signal receiver 31 is configured to receive the first instruction signal sent by the signal transmitter 30 and transmit the first instruction signal to a control circuit of the auxiliary flexible display panel 2. The control circuit of the auxiliary flexible display panel 2 is configured to control the auxiliary flexible display panel 2 to be in a non-display state in response to the first instruction signal.

Figure 8:
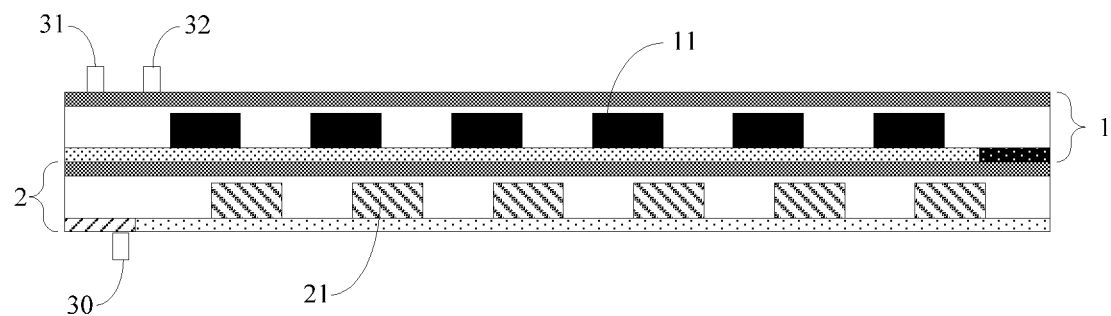
FIG. 8 is a schematic view showing a signal transmitter not overlapping with a first signal receiver and a second signal receiver.

As shown in FIG. 8, after the flexible display device is stretched and the orthographic projection of the signal transmitter 30 onto the main flexible display panel 1 does not overlap with the first signal receiver 31 and the second signal receiver 32, the first signal receiver 31 and the second signal receiver 32 are unable to receive the first instruction signal and the second instruction signal transmitted by the signal transmitter 30. The control circuit of the auxiliary flexible display panel 2 is configured to control the auxiliary flexible display panel 2 to be in a first display state. In the first display state, the orthographic projection of the auxiliary pixel unit 21 onto the main flexible display panel 1 overlaps with at least one main pixel unit 11, and the auxiliary pixel unit 21 and the at least one main pixel unit 11 have the same display gray scale.

Figure 9:
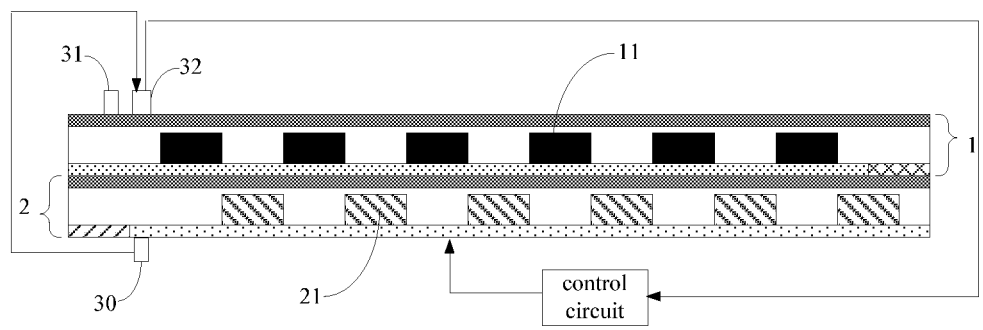
FIG. 9 is a schematic view of signal transmission when a signal transmitter overlaps with a second signal receiver.

As shown in FIG. 9, in the case that the orthographic projection of the signal transmitter 30 onto the main flexible display panel 1 overlaps with the second signal receiver 32, the signal transmitter 30 is further configured to transmit the second instruction signal, the second signal receiver 32 is configured to receive the second instruction signal sent by the signal transmitter 30 and transmit the second instruction signal to the control circuit of the auxiliary flexible display panel 2. The control circuit of the auxiliary flexible display panel 2 is configured to control the auxiliary flexible display panel 2 to be in a second display state in response to the second instruction signal. In the second display state, the orthographic projection of the auxiliary pixel unit 21 onto the main flexible display panel 1 does overlap with any one of the main pixel units 11, and the auxiliary pixel unit 21 and the main pixel unit 11 have the same or different display gray scales.

It should be noted that, in the case that the orthographic projection of the signal transmitter 30 onto the main flexible display panel 1 overlaps with the first signal receiver 31, when the flexible display device is used for display, only the main flexible display panel 1 is controlled to be in the display state, while the auxiliary flexible display panel 2 is controlled to be in the non-display state. In the case the orthographic projection of the signal transmitter 30 onto the main flexible display panel 1 does not overlap with the first signal receiver 31 and the second signal receiver 32 and the orthographic projection of the signal transmitter 30 onto the main flexible display panel 1 overlaps with the second signal receiver 32, the main pixel units 11 may be misaligned with the auxiliary pixel units 21, so that the orthographic projections of the auxiliary pixel units 21 onto the main flexible display panel 1 do not completely overlap with any one of the main pixel units 11. When the flexible display device is used for display, both the main flexible display panel 1 and the auxiliary flexible display panel 2 may be controlled to be in the display state, thereby effectively improving the number of pixel units per inch of the flexible display device after be stretched and ensuring the display effect of the flexible display device.

Furthermore, when the flexible display device recovers to its original state after being stretched, that is, recovers to the state shown in FIG. 7, the first signal receiver 31 may receive again the first instruction signal sent by the signal transmitter 30 and transmit the first instruction signal to a control circuit (e.g., a control chip) of the auxiliary flexible display panel 2, and the control circuit of the auxiliary flexible display panel 2 is configured to control the auxiliary flexible display panel 2 to be in the non-display state in response to the received first instruction signal, thereby preventing the auxiliary flexible display panel 2 from interfering with the normal display of the flexible display device.

Figure 10:
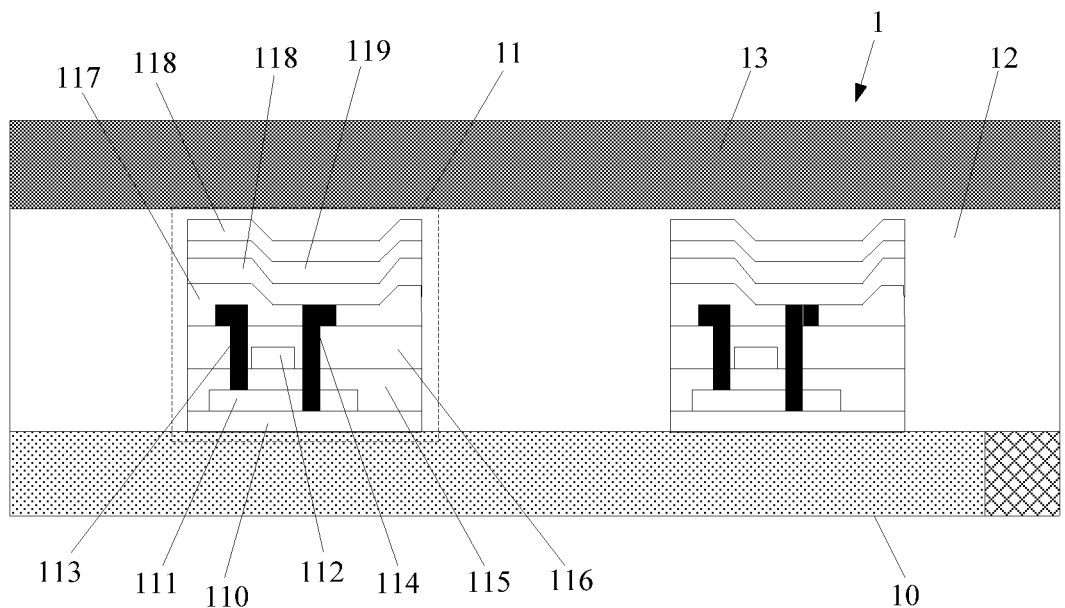
FIG. 10 is a sectional view of a main flexible display panel in some embodiments of the present disclosure.
Figure 11:
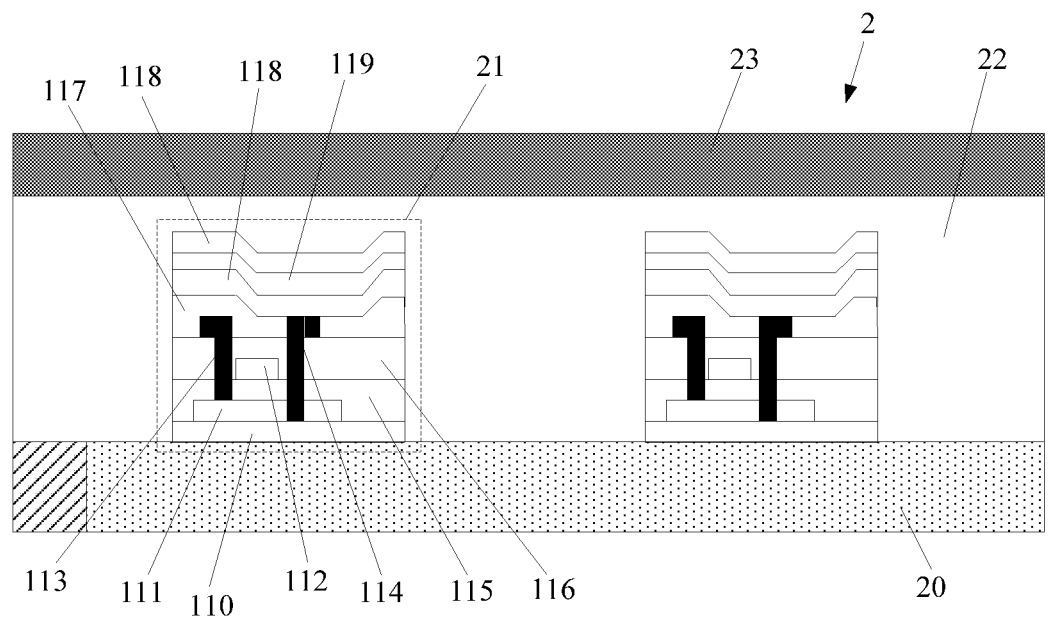
FIG. 11 is a sectional view of an auxiliary flexible display panel in some embodiments of the present disclosure.

It should be noted that, as shown in FIG. 10 and FIG. 11, the main flexible display panel 1 in some embodiments may include: a main base substrate 10, a main pixel unit 11 on the main base substrate 10, a main transparent elastic filling material 12 covering the main base substrate 10 and the main pixel unit 11 and a main encapsulating layer 13 on the main transparent elastic filling material 12. The main pixel unit 11 includes: a first blocking layer 110, a semiconductor layer 111, and a gate electrode 112, a source electrode 113, a drain electrode 114, a first insulating layer 115, a second insulating layer 116, a third insulating layer 117, an electrode 118, and a light-emitting layer 119. The auxiliary flexible display panel 2 may include: an auxiliary base substrate 20, an auxiliary pixel unit 21 on the auxiliary base substrate 20, an auxiliary elastic filling material 22 covering the auxiliary base substrate 20 and the auxiliary pixel unit 21, an auxiliary encapsulation layer 23 on the auxiliary elastic filling material 22. The auxiliary pixel unit 21 includes: a first barrier layer 110, a semiconductor layer 111, a gate electrode 112, a source electrode 113, a drain electrode 114, a first insulating layer 115, a second insulating layer 116, a third insulating layer 117, an electrode 118 and a light-emitting layer 119.

It should be noted that the main pixel units 11 and the auxiliary pixel units 21 are distributed on the base substrate like islands, an elastic material should be filled between the pixel units, and the elastic material, the base substrate and the encapsulation layer are deformed during when stretching the flexible display device. Furthermore, in order not to block the light emission of the auxiliary flexible display panel 2, the elastic material filled in the main flexible display panel 1 should be a transparent elastic material. The elastic material filled in the auxiliary flexible display panel 2 may be a transparent elastic material or an opaque elastic material.

Figure 12A:
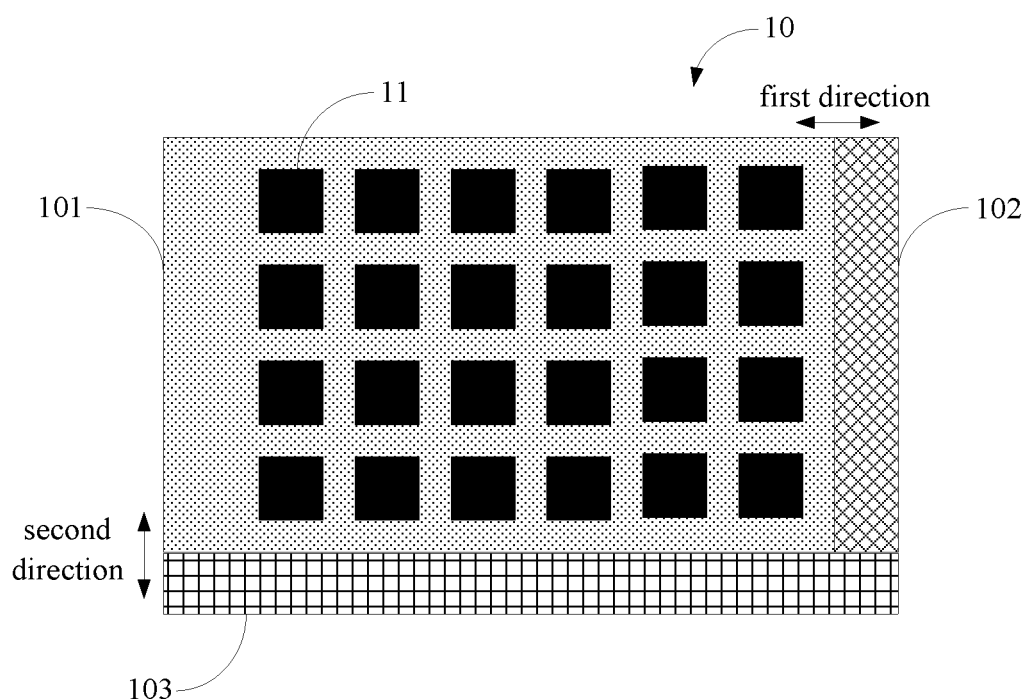
FIG. 12a is a schematic view of a main flexible display panel before being stretched in some embodiments of the present disclosure.
Figure 12B:
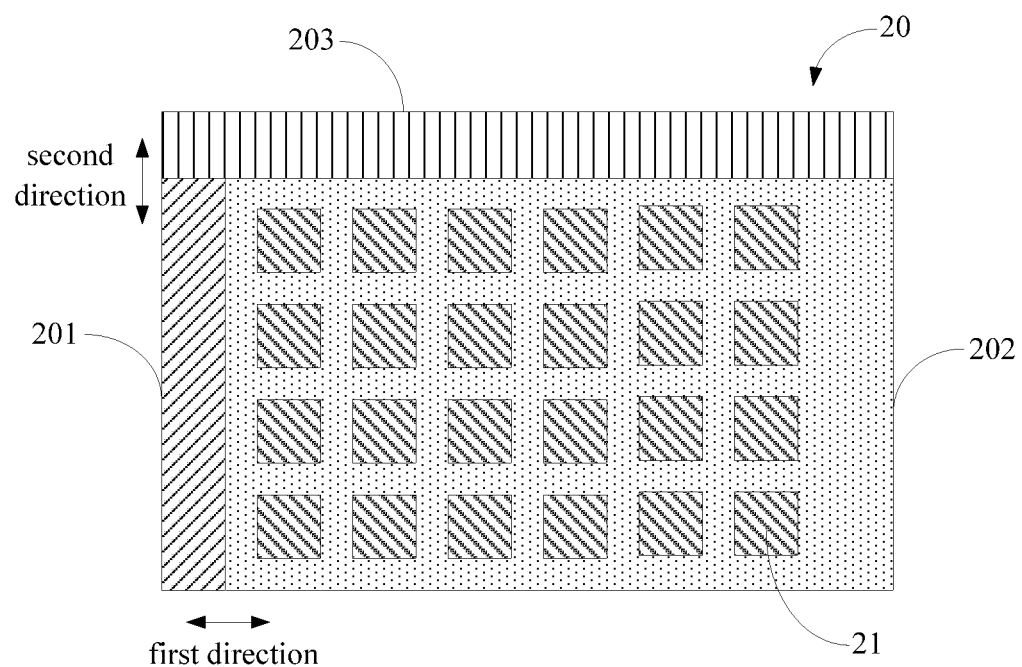
FIG. 12b is a schematic view of an auxiliary flexible display panel before being stretched in some embodiments of the present disclosure.

In some embodiments of the present disclosure, as shown in FIGS. 12a and 12b, the main base substrate 10 of the main flexible display panel 1 includes: a first main sub substrate 101 and a second main sub substrate 102 spliced together in a first direction, and a third main sub substrate 103 spliced together with the first main sub substrate 101 and the second main sub substrate 102 in the second direction. The auxiliary base substrate 20 of the auxiliary flexible display panel 2 includes: a first auxiliary sub substrate 201 and a second auxiliary sub substrate 202 spliced together in the first direction, and a third auxiliary sub substrate 203 spliced together with the first auxiliary sub substrate 201 and the second auxiliary sub substrate 202 in the second direction. A splicing seam between the first main sub substrate 101 and the second main sub substrate 102 and a splicing seam between the first auxiliary sub substrate 201 and the second auxiliary sub substrate 202 are respectively arranged at two opposite sides of the flexible display device in the first direction. A splicing seam between the third main sub substrate 103 and the first main sub substrate 101 and the second main sub substrate 102 and a splicing seam between the third sub substrate 203 and the first auxiliary sub substrate 201 and the second auxiliary sub substrate 202 are respectively arranged at two opposite sides the flexible display device in the second direction.

Figure 12C:
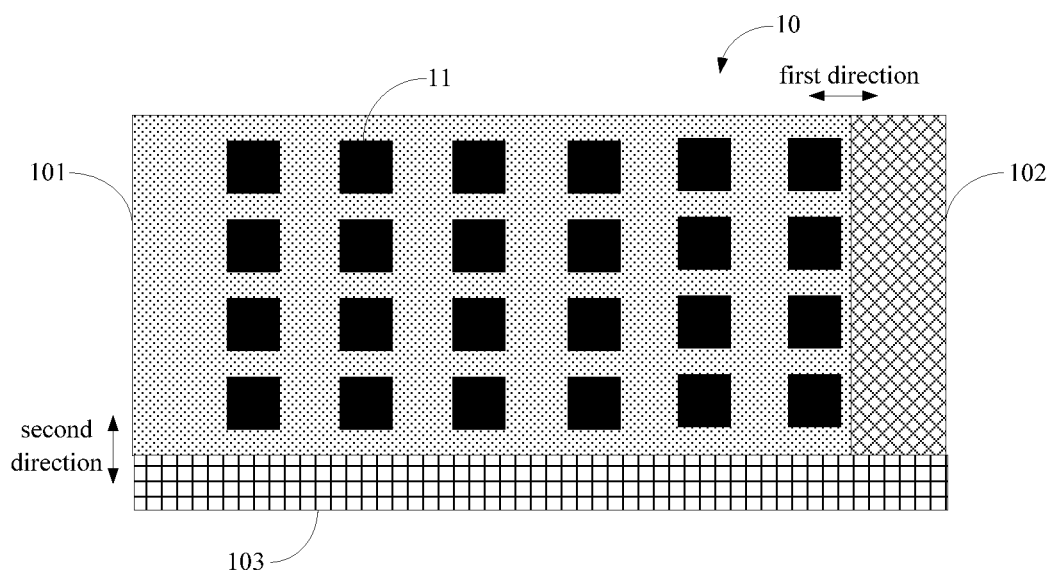
FIG. 12c is a schematic view of a main flexible display panel after being stretched in some embodiments of the present disclosure.
Figure 12D:
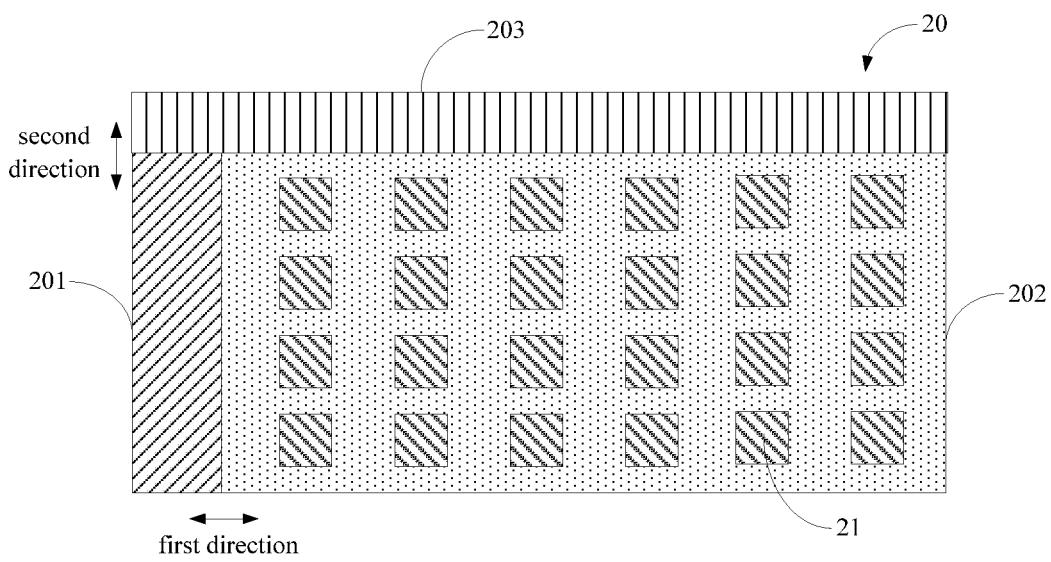
FIG. 12d is a schematic view of an auxiliary flexible display panel after being stretched in some embodiments of the present disclosure.
Figure 12E:
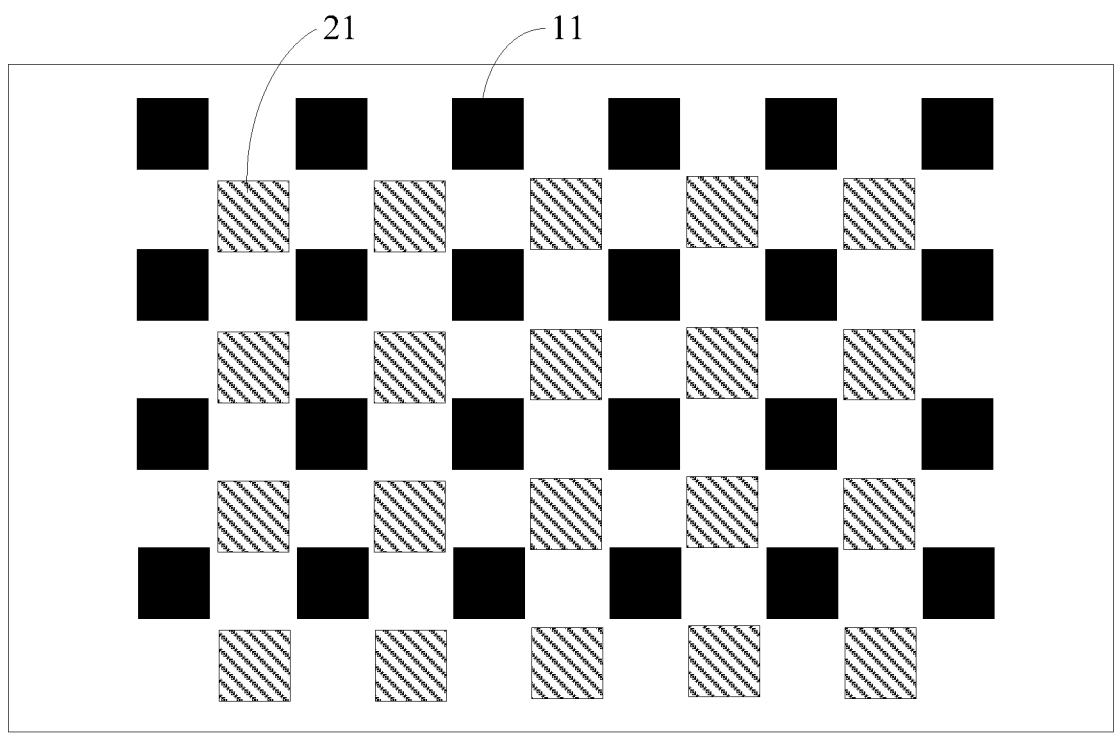
FIG. 12e is a top view of a flexible display device in a stretched state in some embodiments of the present disclosure.

For example, the first auxiliary sub substrate 201, the second main sub substrate 102, and the third main sub substrate 103 have different elastic moduli, the first auxiliary sub substrate 201 and the second auxiliary sub substrate 202 and the third auxiliary sub substrate 203 have different elastic moduli, and the splicing seam between the third main sub substrate 103 and the first main sub substrate 101 and the second main sub substrate 102 and the splicing seam between the third sub substrate 203 and the first auxiliary sub substrate 201 and the second auxiliary sub substrate 202 are respectively arranged at two opposite sides the flexible display device in the second direction, so that when the flexible display device is stretched in the first direction, as shown in FIGS. 12*c*-12*e*, each of the main pixel units 11 in the main flexible display panel 1 and each of the auxiliary pixel units 21 in the auxiliary flexible display panel 2 are stretched and moved in the first direction by different distances, thereby making the main pixel units 11 to be misaligned with the auxiliary pixel unit 21 in the first direction, so that the orthographic projection of the auxiliary pixel unit 21 onto the main flexible display panel 1 do not completely overlap with any one of the main pixel units 11. Similarly, when the flexible display device is stretched in the second direction, as shown in FIGS. 12*c*-12*e*, each of the main pixel units 11 in the main flexible display panel 1 and each of the auxiliary pixel units 21 in the auxiliary flexible display panel 2 are stretched and moved in the second direction by different distances. Therefore, the main pixel unit 11 may be misaligned with each auxiliary pixel unit 21 in the second direction, so that the orthographic projection of the auxiliary pixel unit 21 onto the main flexible display panel 1 do not completely overlap with any one of the main pixel units 11, so that the auxiliary pixel unit 21 is added between the adjacent main pixel units 11, thereby effectively increasing the number of pixel units per inch of the flexible display device after being stretched, thereby ensuring the display effect of the flexible display device.

In some embodiments of the present disclosure, the main base substrate of the main flexible display panel includes: a first main sub substrate and a second main sub substrate spliced together in the first direction and a third main sub substrate spliced together with the first main sub substrate and the second main sub substrate in the second direction; or the auxiliary base substrate of the auxiliary flexible display panel includes: a first auxiliary sub substrate and a second auxiliary sub substrate spliced together in the first direction and a third auxiliary sub substrate spliced together with the first auxiliary sub substrate and the second auxiliary sub substrate in the second direction.

Figure 13A:
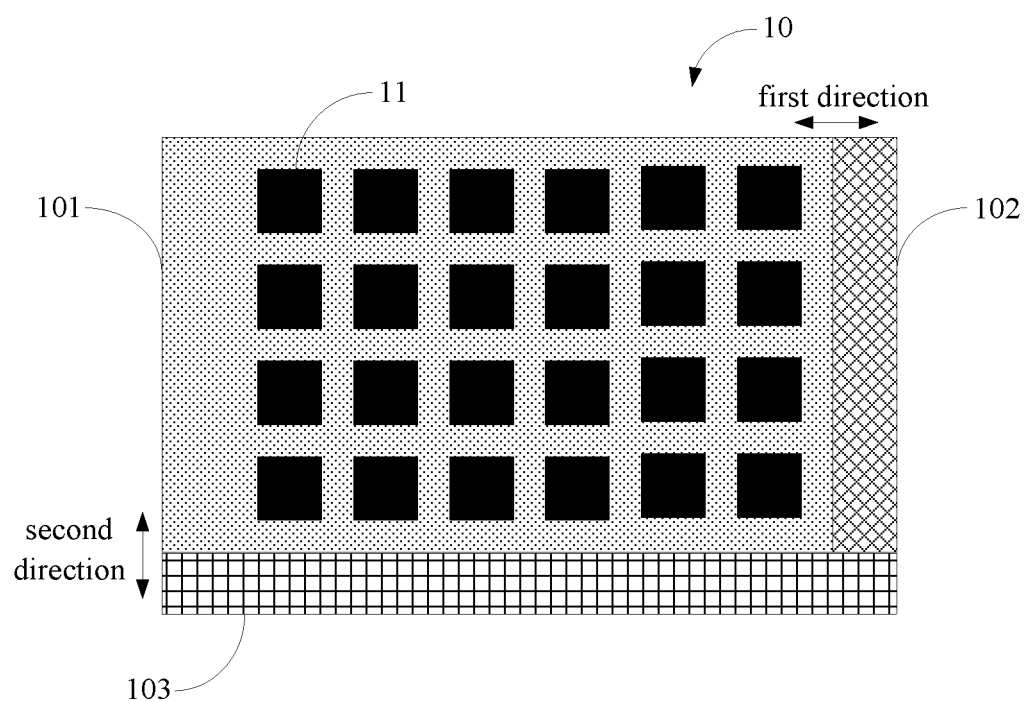
FIG. 13a is a schematic view of a main flexible display panel before being stretched in some embodiments of the present disclosure.
Figure 13B:
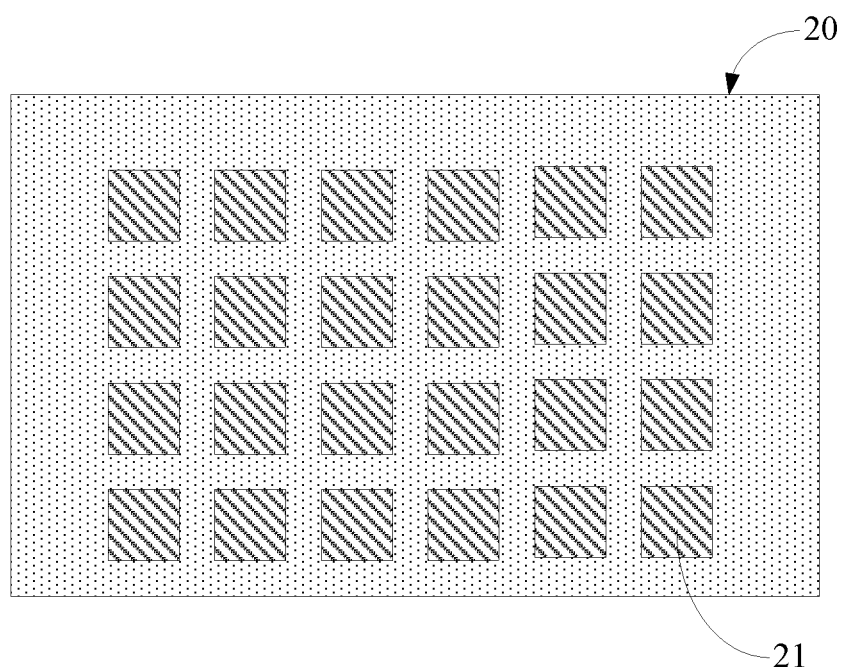
FIG. 13b is a schematic view of an auxiliary flexible display panel before being stretched in some embodiments of the present disclosure.

For example, as shown in FIGS. 13*a* and 13*b*, the main base substrate 10 in the main flexible display panel 1 includes: a first main sub substrate 101 and a second main sub substrate 102 spliced together in the first direction and a third main sub substrate 103 spliced together with the first main sub substrate 101 and the second main sub substrate 102 in the second direction. The auxiliary base substrate 20 in the auxiliary flexible display panel 2 is a one-piece base substrate.

Figure 13C:
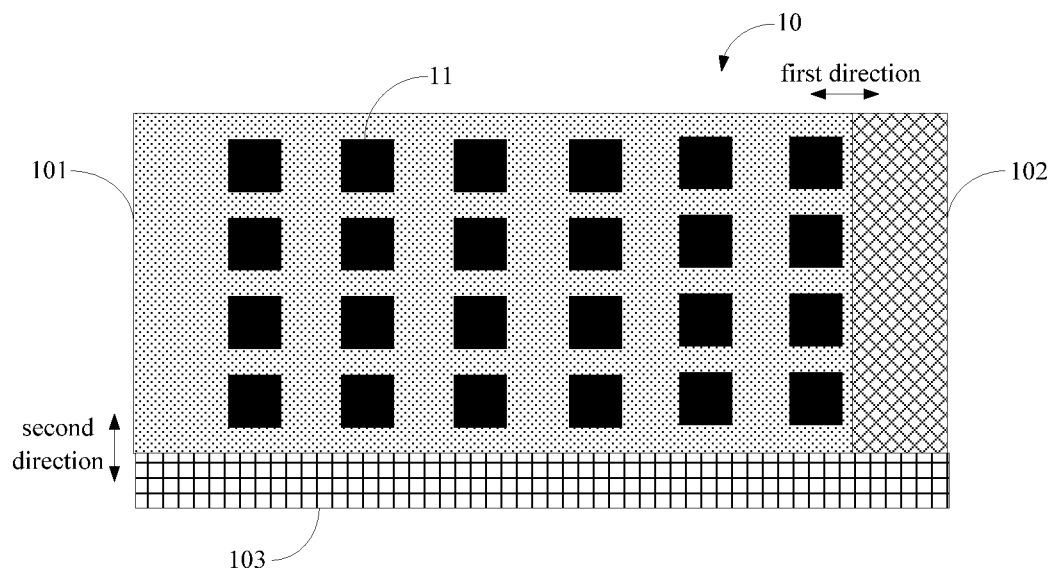
FIG. 13c is a schematic view of a main flexible display panel after being stretched in some embodiments of the present disclosure.
Figure 13D:
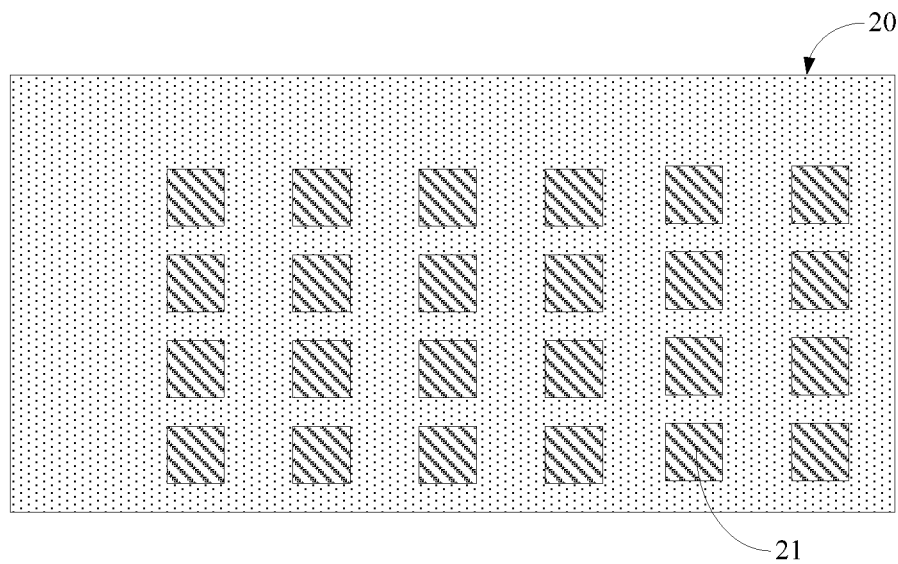
FIG. 13d is a schematic view of an auxiliary flexible display panel after being stretched in some embodiments of the present disclosure.

To be specific, when the flexible display device is stretched in the first direction and/or the second direction, as shown in FIGS. 13*c* and 13*d*, each of the main pixel units 11 in the main flexible display panel 1 and each of the auxiliary pixel units 21 in the auxiliary flexible display panel 2 are stretched and moved by different distances.

Figure 14A:
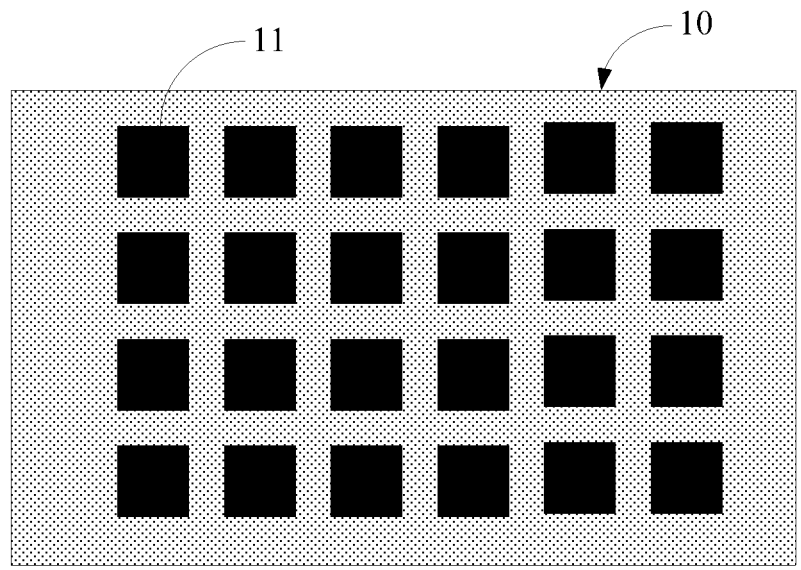
FIG. 14a is a schematic view of a main flexible display panel before being stretched in some embodiments of the present disclosure.
Figure 14B:
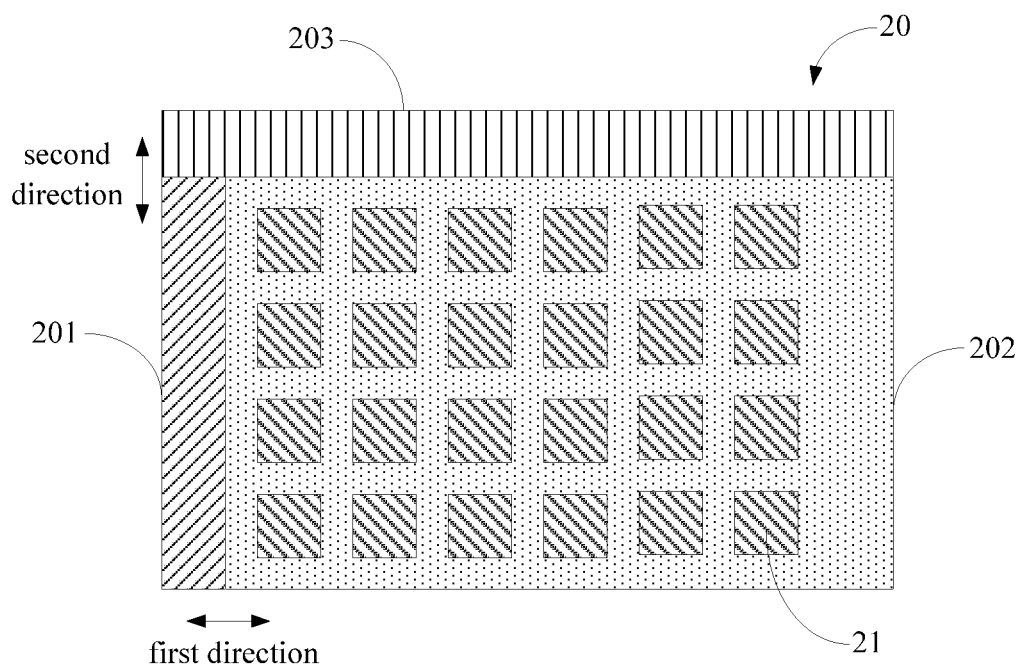
FIG. 14b is a schematic view of an auxiliary flexible display panel before being stretched in some embodiments of the present disclosure.

For example, as shown in FIGS. 14*a* and 14*b*, the main base substrate 10 in the main flexible display panel 1 is a one-piece base substrate, the auxiliary base substrate 20 in the auxiliary flexible display panel 2 includes: a first auxiliary sub substrate 201 and a second auxiliary sub substrate 202 spliced together in the first direction and a third sub substrate 203 spliced together with the first auxiliary sub substrate 201 and the second auxiliary sub substrate 202 in the second direction.

Figure 14C:
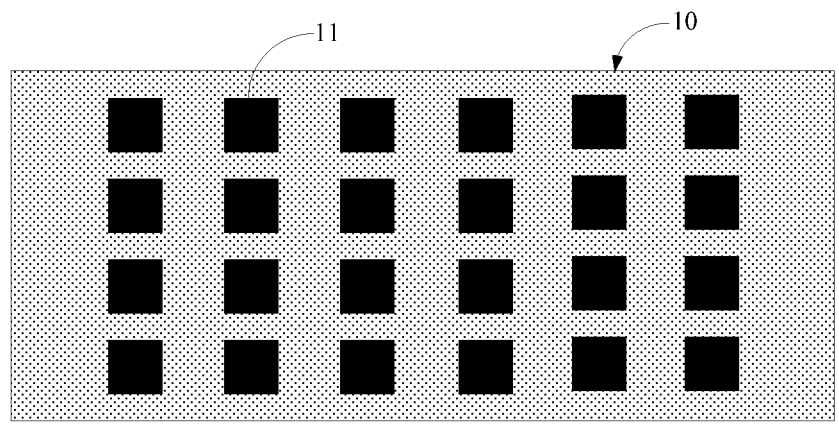
FIG. 14c is a schematic view of a main flexible display panel after being stretched in some embodiments of the present disclosure.
Figure 14D:
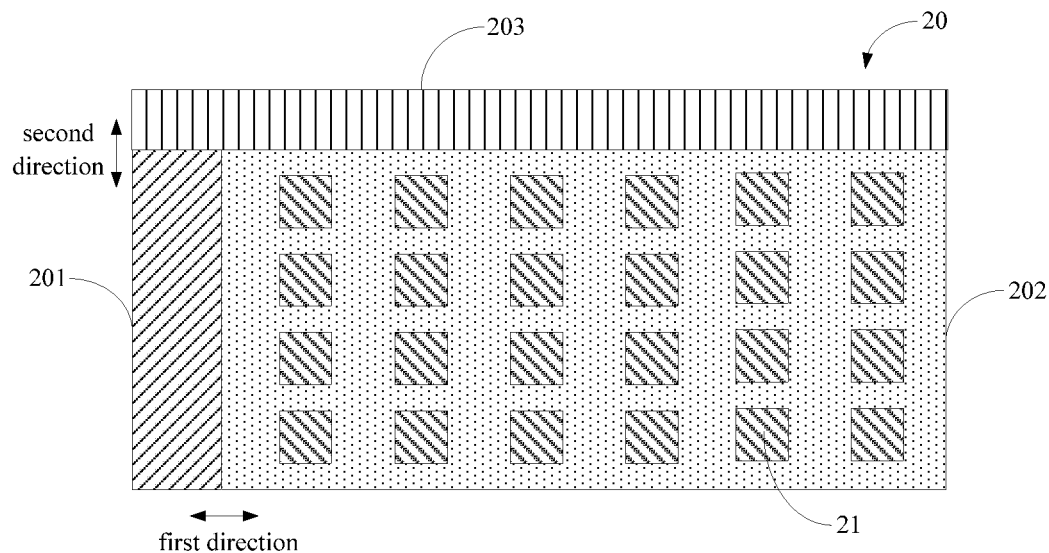
FIG. 14d is a schematic view of an auxiliary flexible display panel after being stretched in some embodiments of the present disclosure.

To be specific, when the flexible display device is stretched in the first direction and/or the second direction, as shown in FIGS. 14*c* and 14*d*, each of the main pixel units 11 in the main flexible display panel 1 and each of the auxiliary pixel units 21 in the auxiliary flexible display panel 2 are stretched and moved by different distances.

In some embodiments of the present disclosure, the main base substrate of the main flexible display panel includes: a first main sub substrate and a second main sub substrate spliced together in the first direction and a third main sub substrate spliced together with the first main sub substrate and the second main sub substrate in the second direction; the auxiliary base substrate of the auxiliary flexible display panel includes: a first auxiliary sub substrate and a second auxiliary sub substrate spliced together in the first direction; or the auxiliary base substrate of the auxiliary flexible display panel includes: a second auxiliary sub substrate and a third auxiliary sub substrate spliced together in the second direction.

Figure 15A:
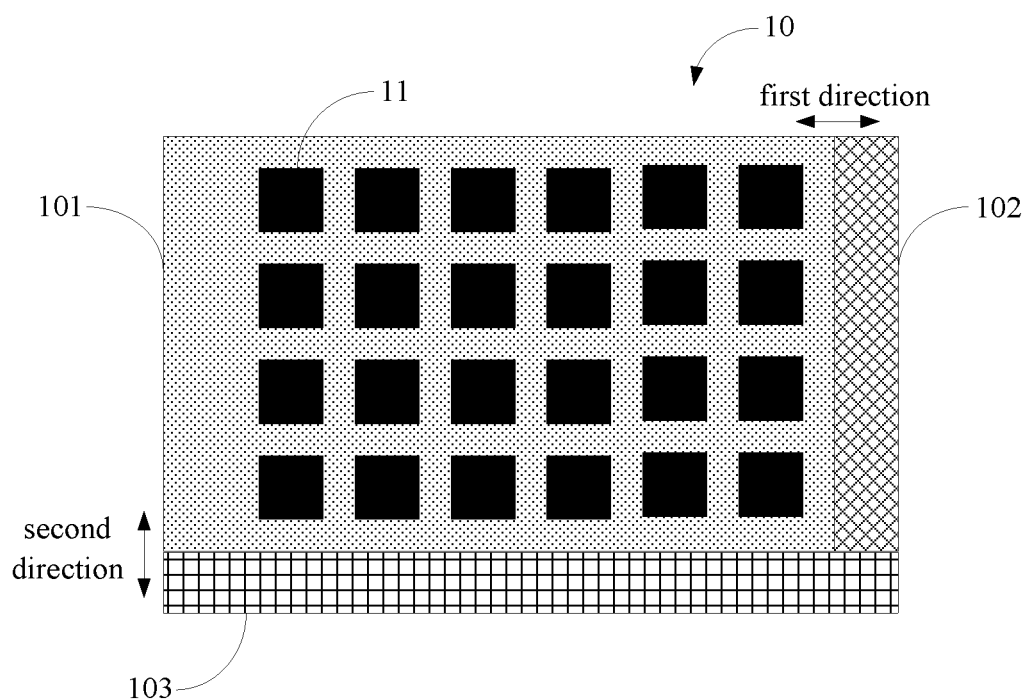
FIG. 15a is a schematic view of a main flexible display panel before being stretched in some embodiments of the present disclosure.
Figure 15B:
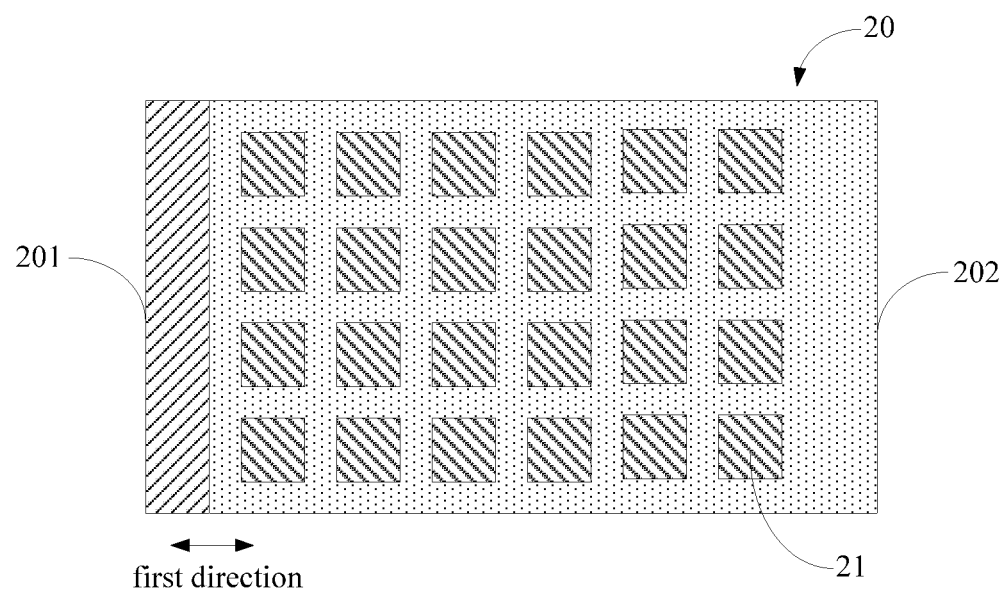
FIG. 15b is a schematic view of an auxiliary flexible display panel before being stretched in some embodiments of the present disclosure.

For example, as shown in FIGS. 15*a* and 15*b*, the main base substrate 10 of the main flexible display panel 1 includes: a first main sub substrate 101 and a second main sub substrate 102 spliced together in the first direction and a third main sub substrate 103 spliced together with the first main sub substrate 101 and the second main sub substrate 102 in the second direction. The auxiliary base substrate 20 of the auxiliary flexible display panel 2 includes: a first auxiliary sub substrate 201 and a second auxiliary sub substrate 202 spliced together in the first direction.

Figure 15C:
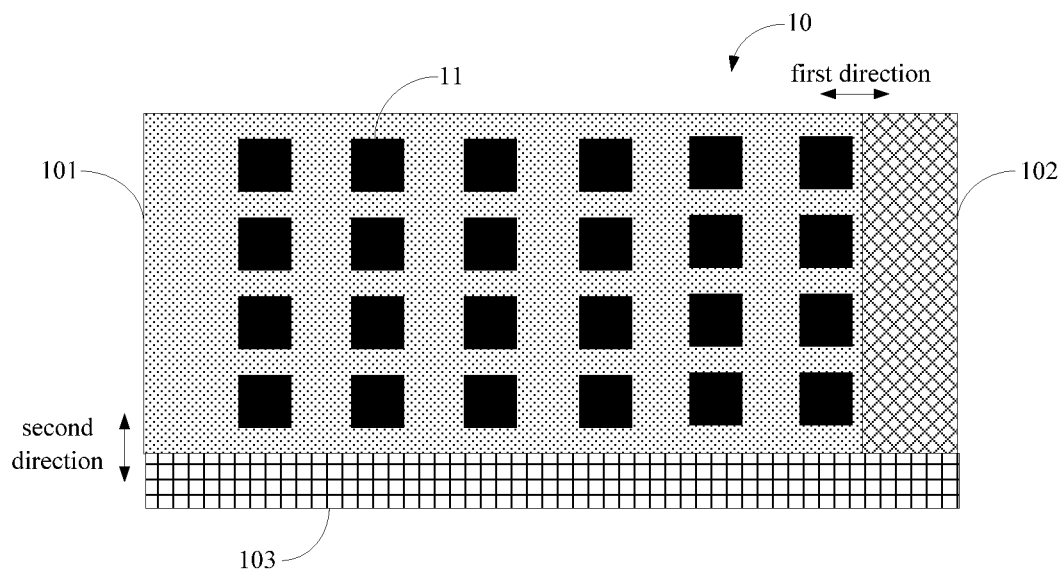
FIG. 15c is a schematic view of a main flexible display panel after being stretched in some embodiments of the present disclosure.
Figure 15D:
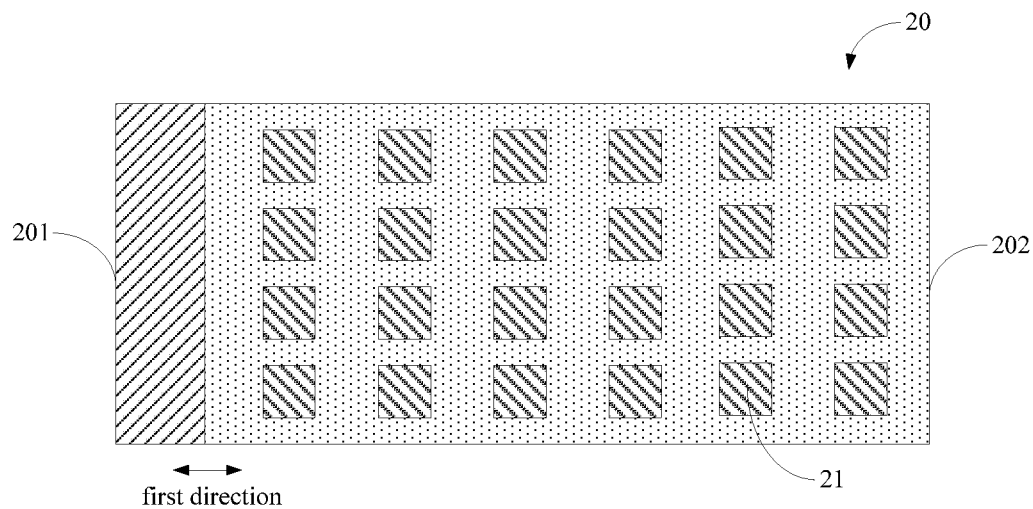
FIG. 15d is a schematic view of an auxiliary flexible display panel after being stretched in some embodiments of the present disclosure.

In more detail, when the flexible display device is stretched in the first direction and/or the second direction, as shown in FIGS. 15*c* and 15*d*, each of the main pixel units 11 in the main flexible display panel 1 and each of the auxiliary pixel units 21 in the auxiliary flexible display panel 2 are stretched and moved by different distances.

Figure 16A:
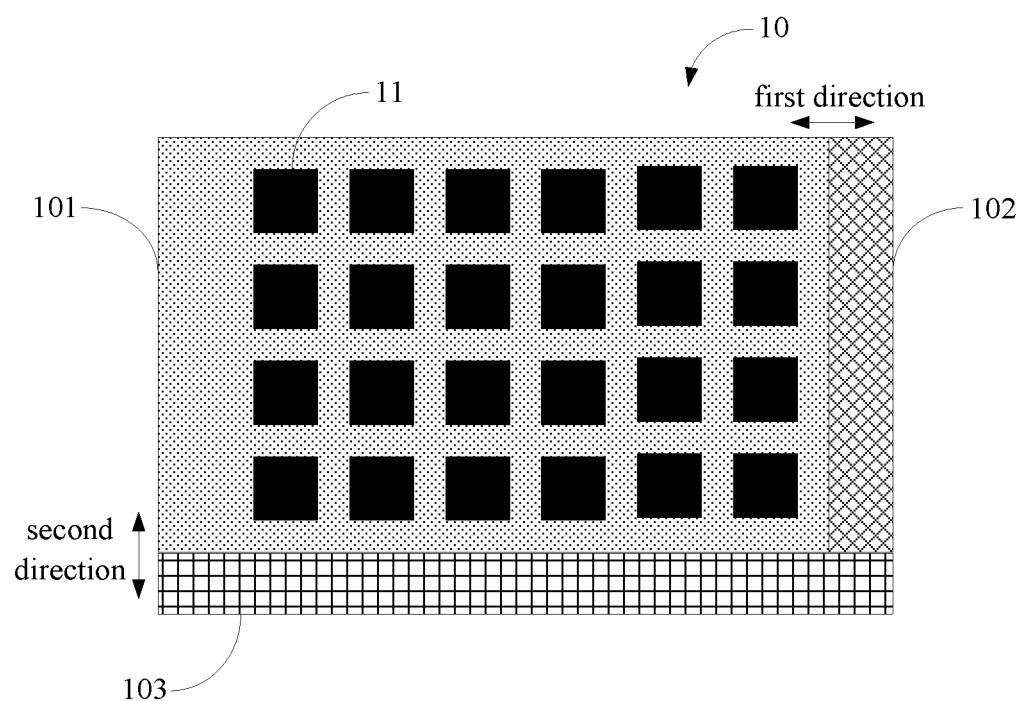
FIG. 16a is a schematic view of a main flexible display panel before being stretched in some embodiments of the present disclosure.
Figure 16B:
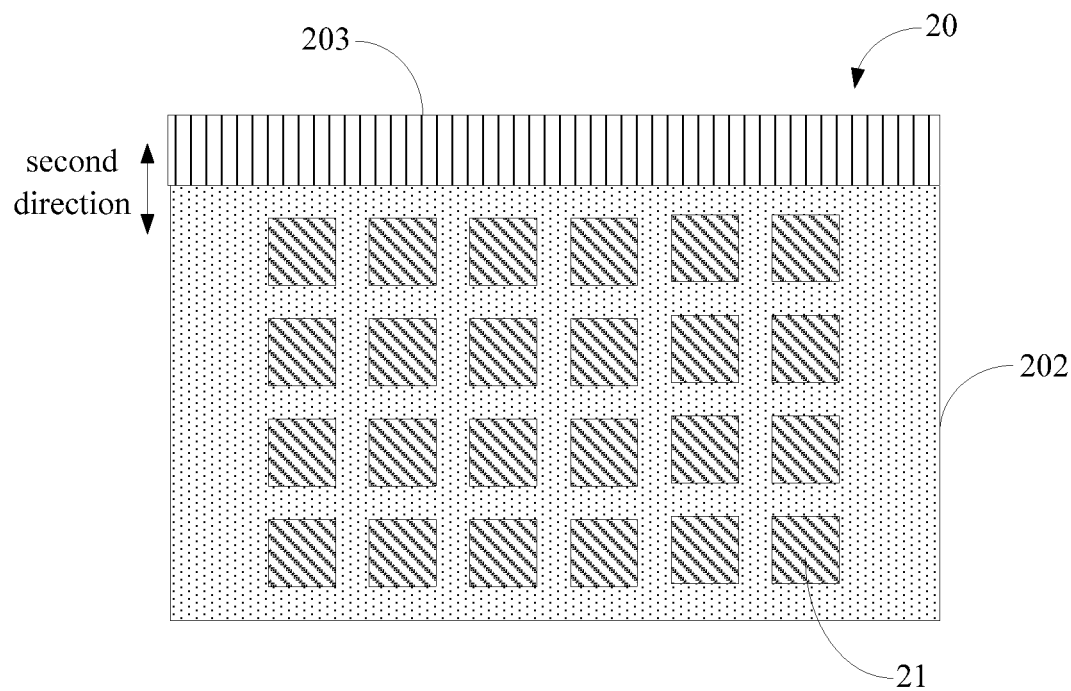
FIG. 16b is a schematic view of an auxiliary flexible display panel before being stretched in some embodiments of the present disclosure.

For example, as shown in FIGS. 16*a* and 16*b*, the main base substrate 10 of the main flexible display panel 1 includes: a first main sub substrate 101 and a second main sub substrate 102 spliced together in the first direction and a third main sub substrate 103 spliced together with the first main sub substrate 101 and the second main sub substrate 102 in the second direction. The auxiliary base substrate 20 of the auxiliary flexible display panel 2 includes: a second auxiliary sub substrate 202 and a third auxiliary sub substrate 203 and spliced together in the second direction.

Figure 16C:
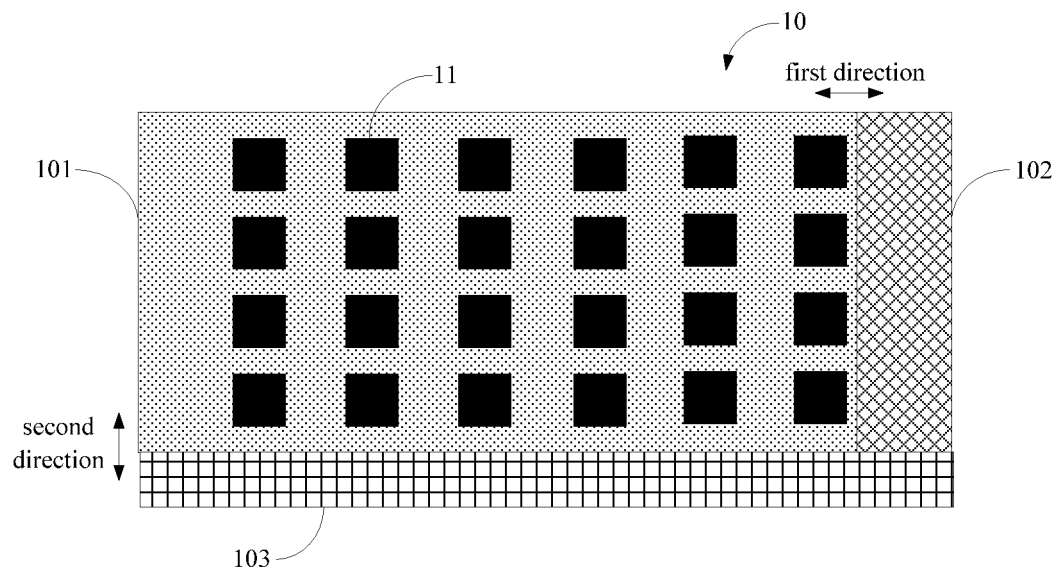
FIG. 16c is a schematic view of a main flexible display panel after being stretched in some embodiments of the present disclosure.
Figure 16D:
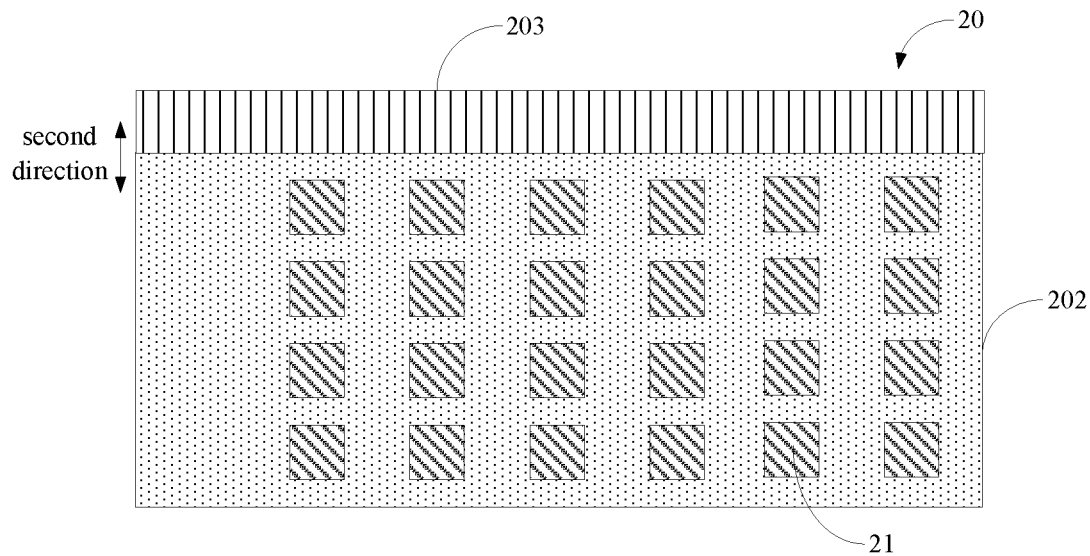
FIG. 16d is a schematic view of an auxiliary flexible display panel after being stretched in some embodiments of the present disclosure.

In more detail, when the flexible display device is stretched in the first direction and/or the second direction, as shown in FIGS. 16*c* and 16*d*, each of the main pixel units 11 in the main flexible display panel 1 and each of the auxiliary pixel units 21 in the auxiliary flexible display panel 2 are stretched and moved by different distances.

In some embodiments of the present disclosure, the auxiliary base substrate of the auxiliary flexible display panel includes: a first auxiliary sub substrate and a second auxiliary sub substrate spliced together in the first direction and a third auxiliary sub substrate spliced together with the first auxiliary sub substrate and the second auxiliary sub substrate in the second direction; the main base substrate of the main flexible display panel includes: a first main sub substrate and a second main sub substrate spliced together in the first direction; or the main base substrate of the main flexible display panel includes: a first main sub substrate and a third main sub substrate spliced together in the second direction.

Figure 17A:
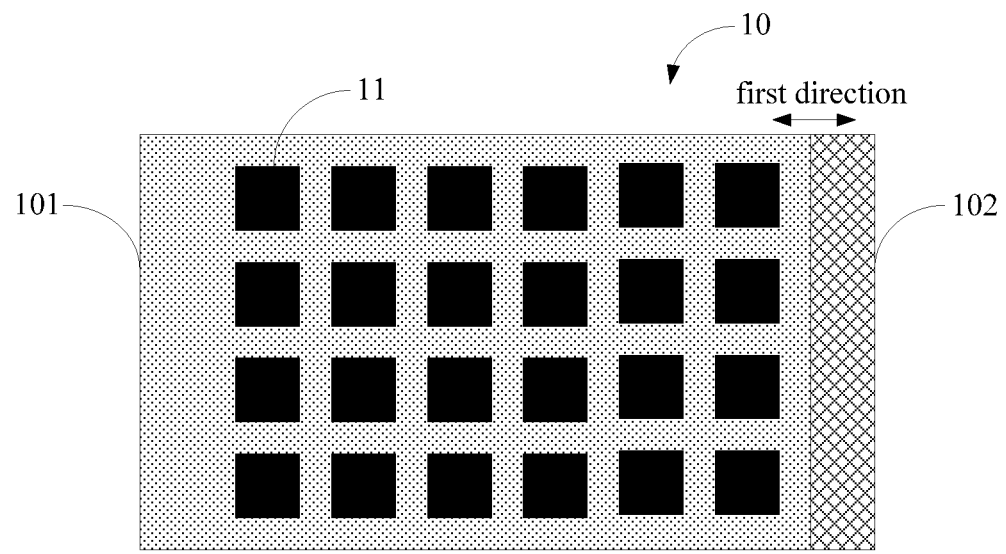
FIG. 17a is a schematic view of a main flexible display panel before being stretched in some embodiments of the present disclosure.
Figure 17B:
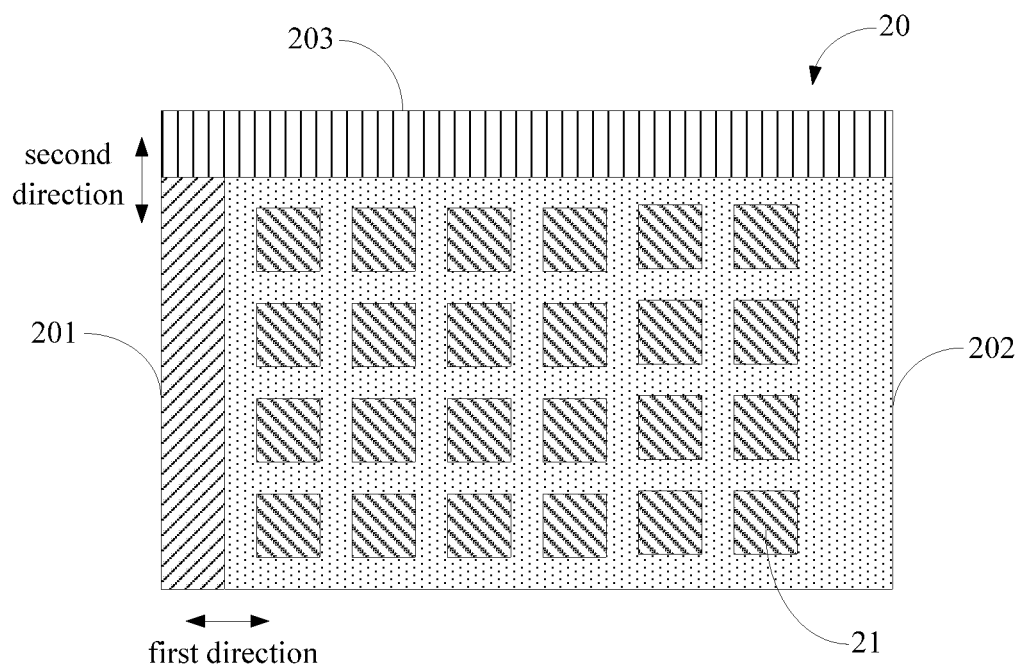
FIG. 17b is a schematic view of an auxiliary flexible display panel before being stretched in some embodiments of the present disclosure.

For example, as shown in FIG. 17*a* and FIG. 17*b*, the auxiliary base substrate 20 of the auxiliary flexible display panel 2 includes: a first auxiliary sub substrate 201 and a second auxiliary sub substrate 202 spliced together in the first direction and a third auxiliary sub substrate 203 spliced together with the first auxiliary sub substrate 201 and the second auxiliary sub substrate 202 in the second direction. The main base substrate 10 of the main flexible display panel 1 includes: a first main sub substrate 101 and a second main sub substrate 102 spliced together in the first direction.

Figure 17C:
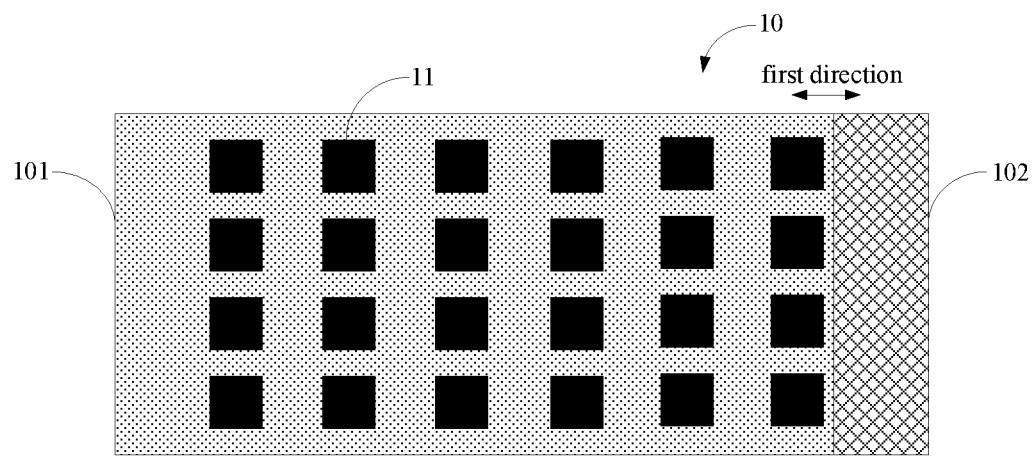
FIG. 17c is a schematic view of a main flexible display panel after being stretched in some embodiments of the present disclosure.
Figure 17D:
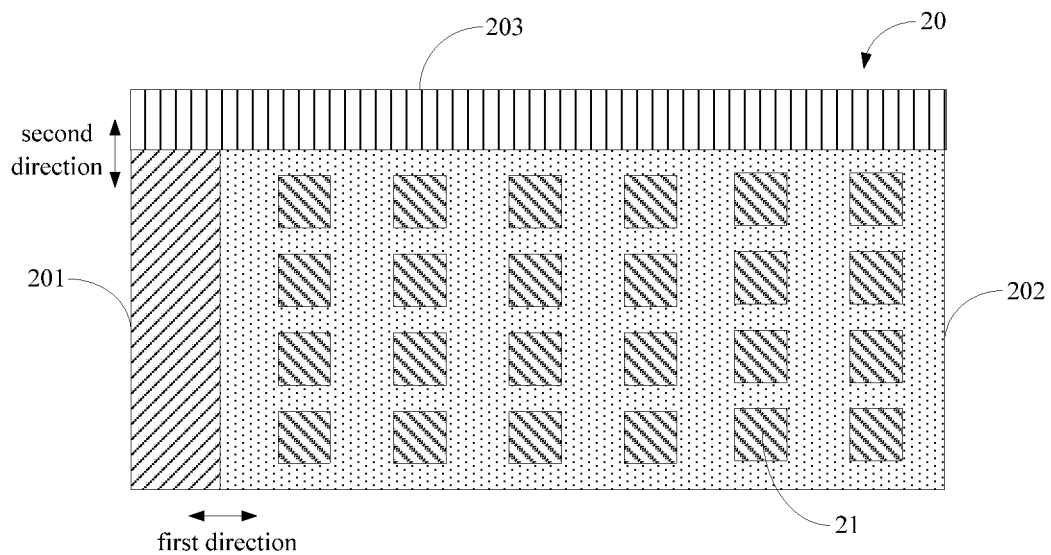
FIG. 17d is a schematic view of an auxiliary flexible display panel after being stretched in some embodiments of the present disclosure.

In more detail, when the flexible display device is stretched in the first direction and/or the second direction, as shown in FIGS. 17*c* and 17*d*, each of the main pixel units 11 in the main flexible display panel 1 and each of the auxiliary pixel units 21 in the auxiliary flexible display panel 2 are stretched and moved by different distances.

Figure 18A:
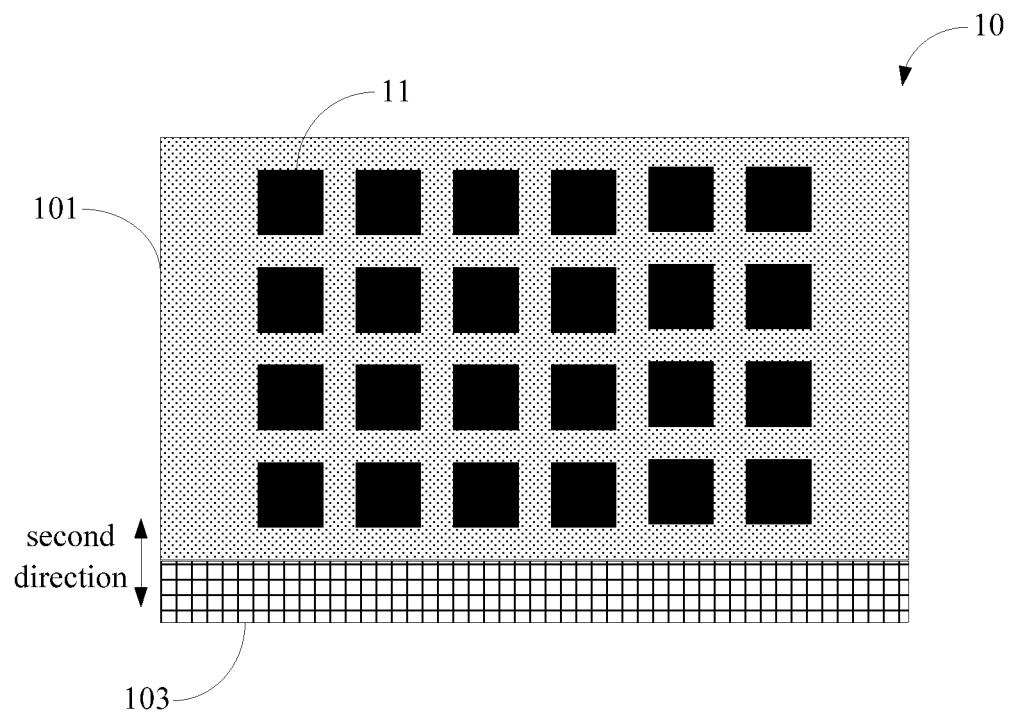
FIG. 18a is a schematic view of a main flexible display panel before being stretched in some embodiments of the present disclosure.
Figure 18B:
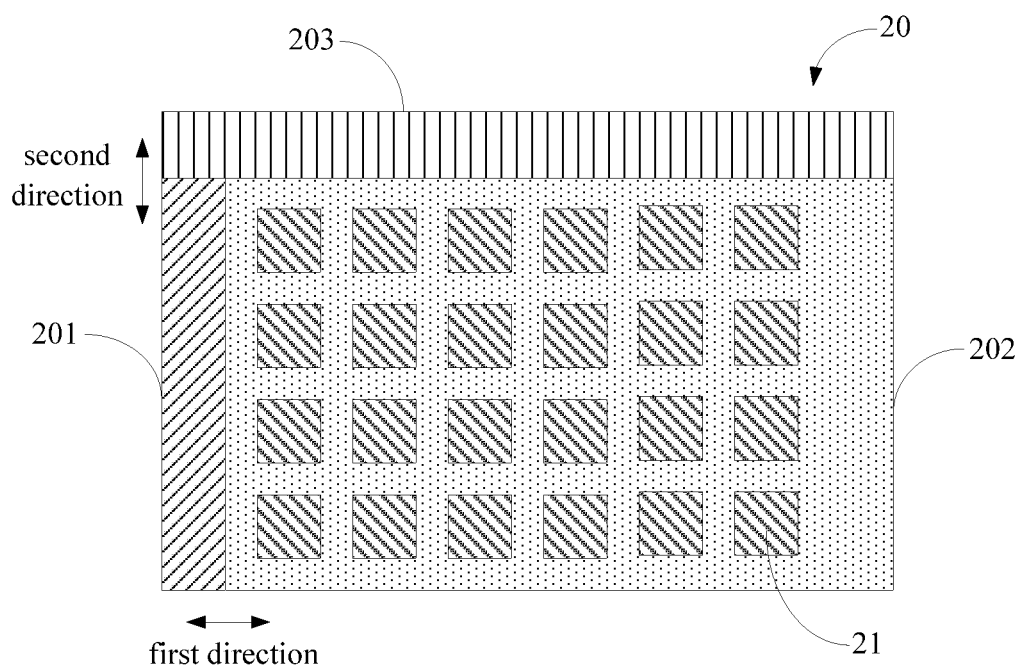
FIG. 18b is a schematic view of an auxiliary flexible display panel before being stretched in some embodiments of the present disclosure.

For example, as shown in FIG. 18*a* and FIG. 18*b*, the auxiliary base substrate 20 of the auxiliary flexible display panel 2 includes: a first auxiliary sub substrate 201 and a second auxiliary sub substrate 202 spliced together in the first direction and a third auxiliary sub substrate 203 spliced together with the first auxiliary sub substrate 201 and the second auxiliary sub substrate 202 in the second direction. The main base substrate 10 of the main flexible display panel 1 includes: a first main sub substrate 101 and a third main sub substrate 103 spliced together in the second direction.

Figure 18C:
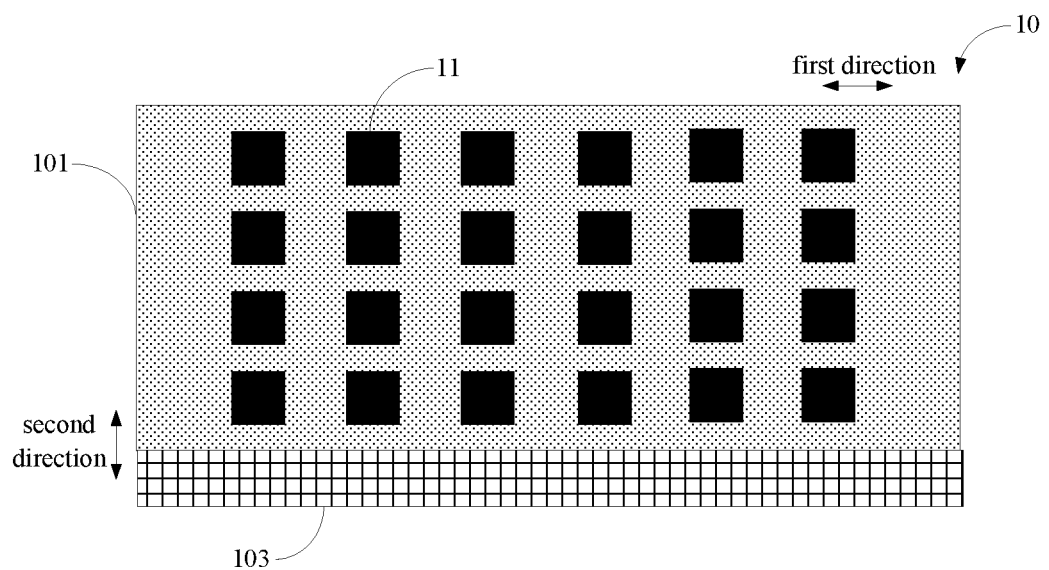
FIG. 18c is a schematic view of a main flexible display panel after being stretched in some embodiments of the present disclosure.
Figure 18D:
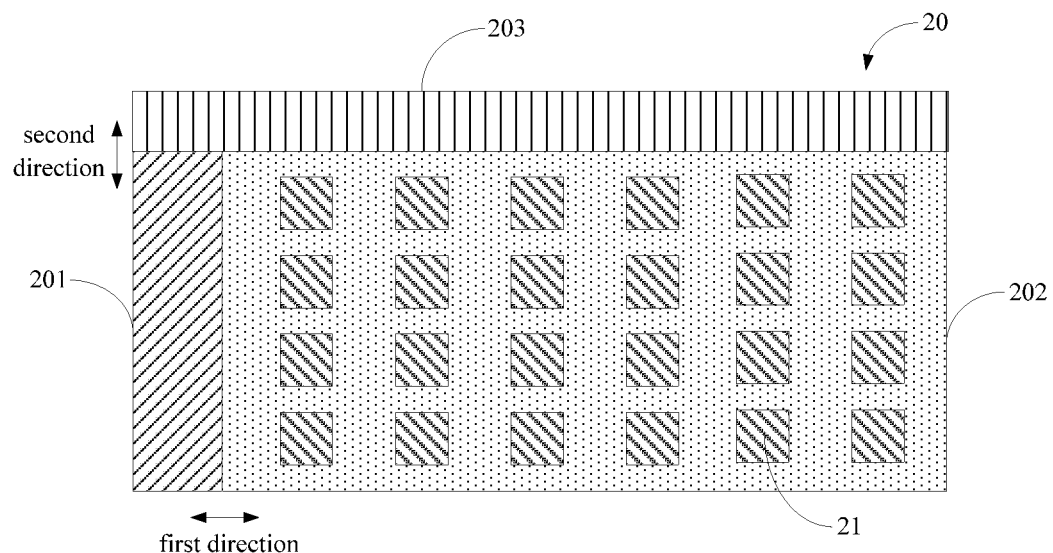
FIG. 18d is a schematic view of an auxiliary flexible display panel after being stretched in some embodiments of the present disclosure.

In more detail, when the flexible display device is stretched in the first direction and/or the second direction, as shown in FIGS. 18*c* and 18*d*, each of the main pixel units 11 in the main flexible display panel 1 and each of the auxiliary pixel units 21 in the auxiliary flexible display panel 2 are stretched and moved by different distances.

Figure 19A:
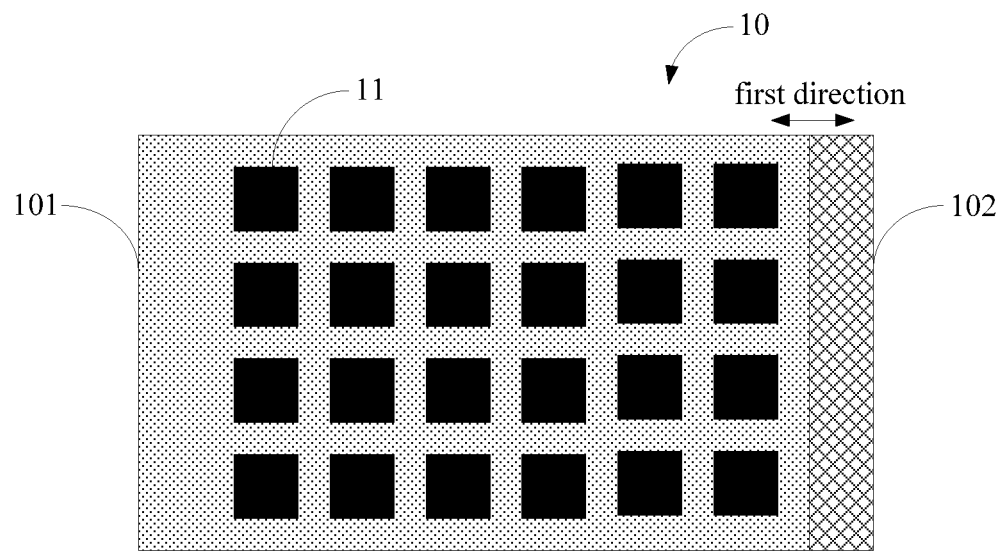
FIG. 19a is a schematic view of a main flexible display panel before being stretched in some embodiments of the present disclosure.
Figure 19B:
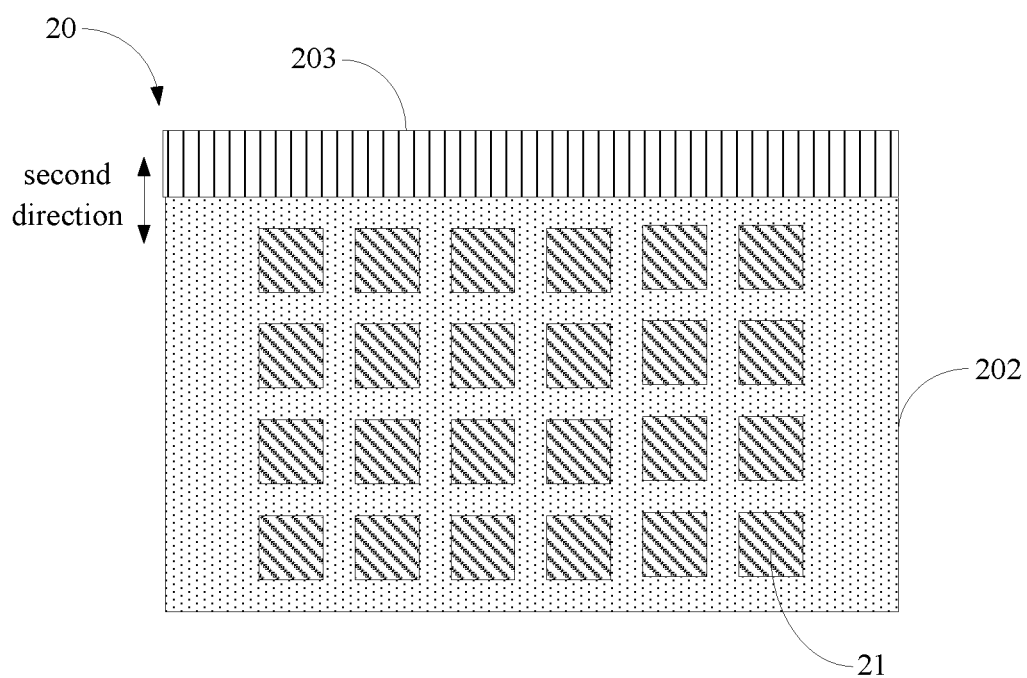
FIG. 19b is a schematic view of an auxiliary flexible display panel before being stretched in some embodiments of the present disclosure.
Figure 19C:
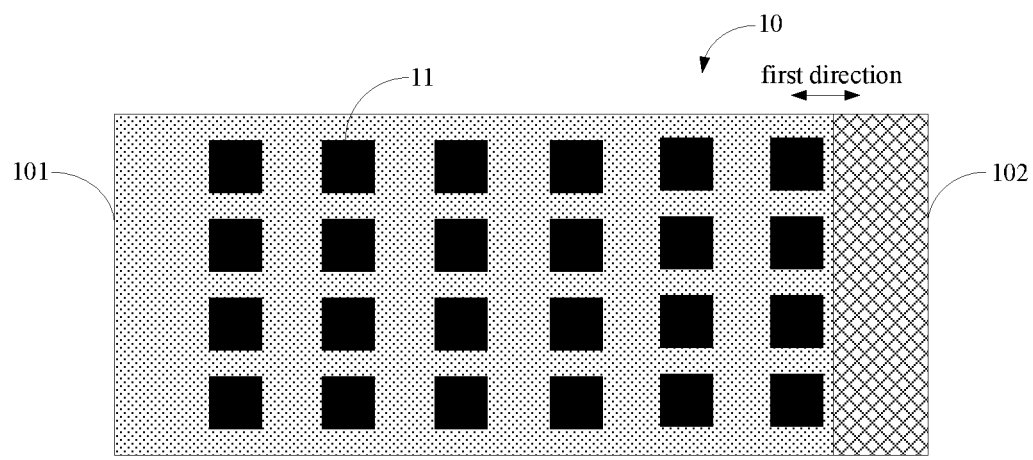
FIG. 19c is a schematic view of a main flexible display panel after being stretched in some embodiments of the present disclosure.
Figure 19D:
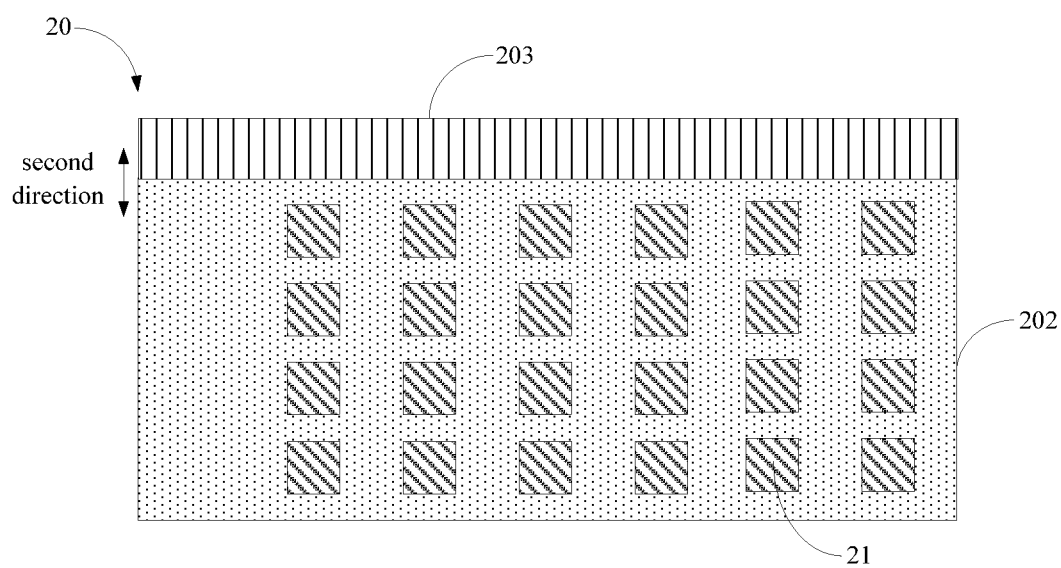
FIG. 19d is a schematic view of an auxiliary flexible display panel after being stretched in some embodiments of the present disclosure.
Figure 20A:
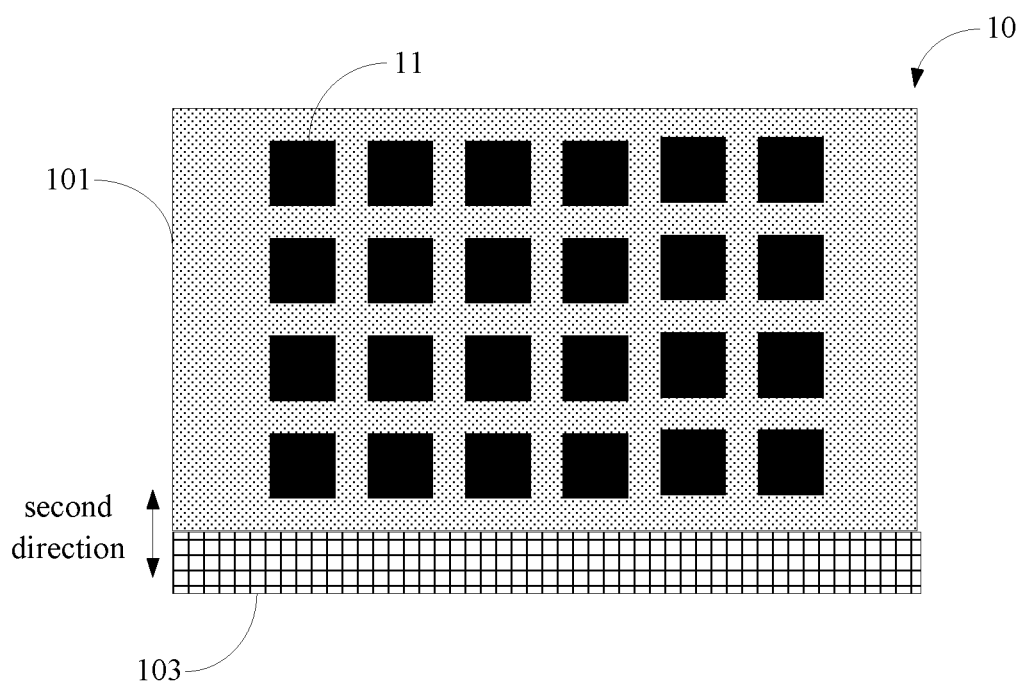
FIG. 20a is a schematic view of a main flexible display panel before being stretched in some embodiments of the present disclosure.
Figure 20B:
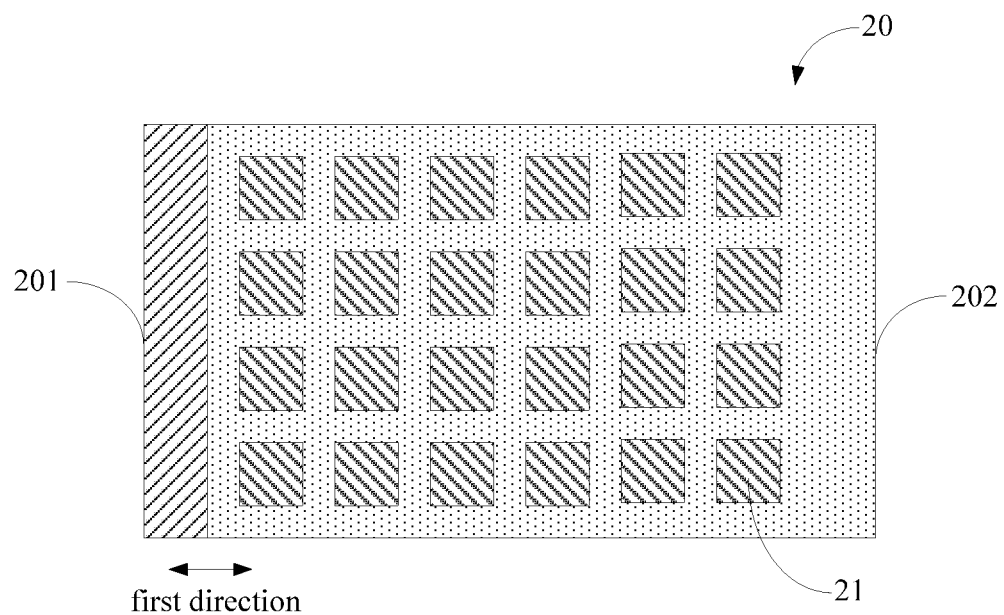
FIG. 20b is a schematic view of an auxiliary flexible display panel before being stretched in some embodiments of the present disclosure.
Figure 20C:
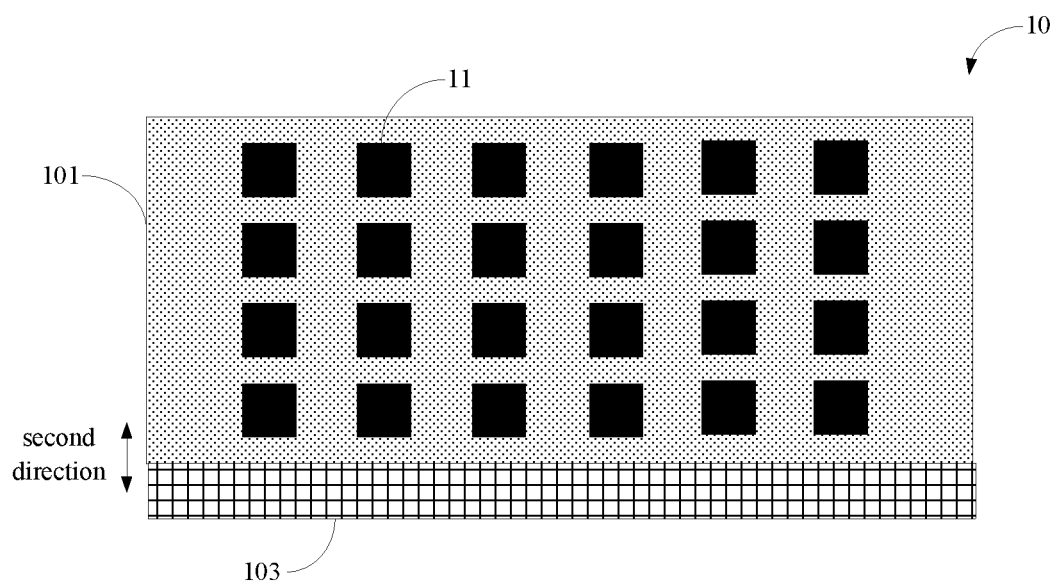
FIG. 20c is a schematic view of a main flexible display panel after being stretched in some embodiments of the present disclosure.
Figure 20D:
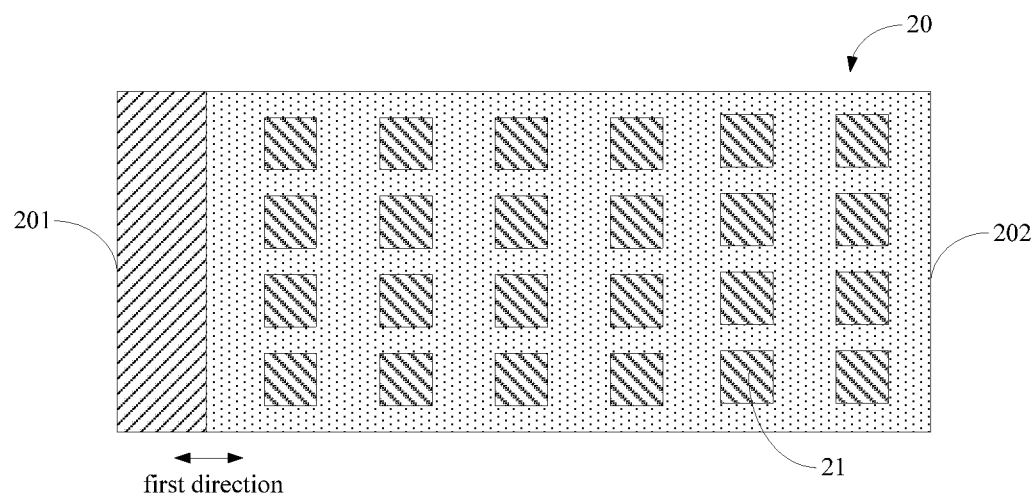
FIG. 20d is a schematic view of an auxiliary flexible display panel after being stretched in some embodiments of the present disclosure.

In some embodiments of the present disclosure, as shown in FIGS. 19*a* and 19*b*, the main base substrate 10 of the main flexible display panel 1 includes: a first main sub substrate 101 and a second main sub substrate 102 spliced together in the first direction, and the auxiliary base substrate 20 of the auxiliary flexible display panel 2 includes: a second auxiliary sub substrate 202 and a third auxiliary sub substrate 203 spliced together in the second direction. Alternatively, as shown in FIGS. 20*a* and 20*b*, the main base substrate 10 of the main flexible display panel 1 includes: a first main sub substrate 101 and a third main sub substrate 103 spliced together in the second direction, and the auxiliary base substrate 20 of the auxiliary flexible display panel 2 includes: a first auxiliary sub substrate 201 and a second auxiliary sub substrate 202 spliced together in the first direction.

In more detail, when the flexible display device is stretched in the first direction and/or the second direction, as shown in FIGS. 19*c* and 19*d*, and FIGS. 20*c* and 20*d*, each of the main pixel units 11 in the main flexible display panel 1 and each of the auxiliary pixel units 21 in the auxiliary flexible display panel 2 are stretched and moved by different distances.

It should be noted that the first direction and the second direction may respectively correspond to the X-axis direction and the Y-axis direction. Of course, the first direction and the second direction may be arranged relative to each other by other preset angles, and the preset angle may be from 30 degrees to 150 degrees, but the present disclosure is not limited herein.

When the base substrate of the flexible display device has the above splicing structures, the flexible display device may be controlled as follows.

Figure 21A:
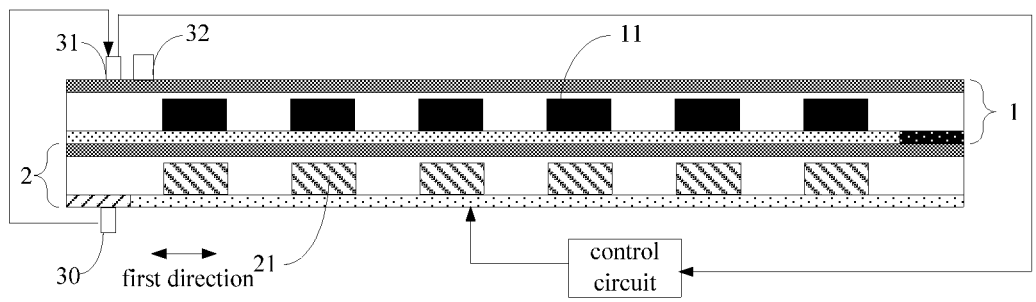
FIG. 21a is a schematic view of signal transmission when a first signal transmitter overlaps with a first signal receiver.
Figure 21B:
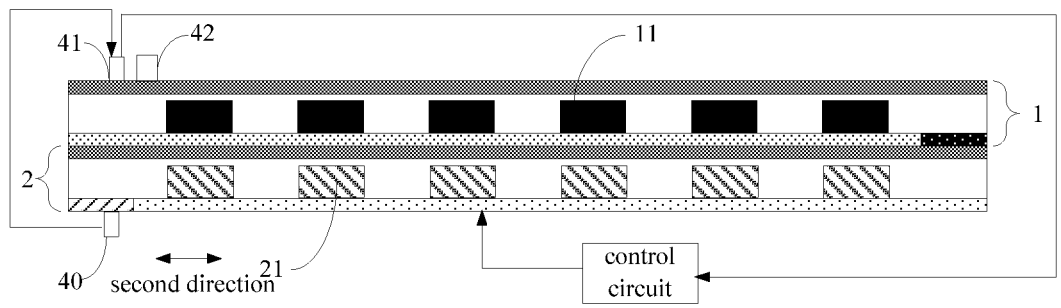
FIG. 21b is a schematic view of signal transmission when a second signal transmitter overlaps with a third signal receiver.

As shown in FIGS. 21*a* and 21*b*, a first signal receiver 31 and a second signal receiver 32 are arranged on the main flexible display panel 1 in the first direction, and a first signal transmitter 30 is arranged on the auxiliary flexible display panel 2; a third signal receiver 41 and a fourth signal receiver 42 are arranged on the main flexible display panel 1 in the second direction, and a second signal transmitter 40 is arranged on the auxiliary flexible display panel 2, where the first signal transmitter 30 is configured to transmit a first instruction signal and a second instruction signal and the second signal transmitter 40 is configured to transmit a third instruction signal and a fourth instruction signal. The first signal receiver 31 is configured to receive the first instruction signal, the second signal receiver 32 is configured to receive the second instruction signal, the third signal receiver 41 is configured to receive the third instruction signal, and the fourth signal receiver 42 is configured to receive the fourth instruction signal. Before the flexible display device is stretched, the first signal transmitter 30 is configured to transmit the first instruction signal in the case that the orthographic projections of the auxiliary pixel units onto the main flexible display panel completely overlap with the main pixel units and an orthographic projection of the first signal transmitter 30 onto the main flexible display panel overlaps with the first signal receiver 31. The second signal transmitter 40 is configured to transmit the third instruction signal in the case that the orthographic projections of the auxiliary pixel units onto the main flexible display panel completely overlap with the main pixel units and an orthographic projection of the second signal transmitter onto the main flexible display panel overlaps with the third signal receiver. The first signal receiver 31 is configured to receive the first instruction signal sent by the first signal transmitter 30 and transmit the first instruction signal to a control circuit of the auxiliary flexible display panel, and the third signal receiver 41 is configured to receive a third instruction signal sent by the second signal transmitter 40 and transmit the third instruction signal to the control circuit of the auxiliary flexible display panel. The control circuit of the auxiliary flexible display panel is configured to control the auxiliary flexible display panel to be in a non-display state in response to the first instruction signal and/or the third instruction signal.

Figure 22A:
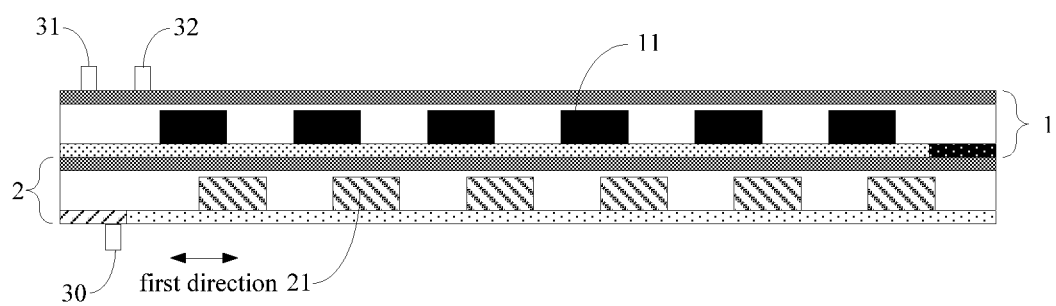
FIG. 22a is a schematic view of signal transmission when a first signal transmitter does not overlap with a first signal receiver and a second signal receiver.
Figure 22B:
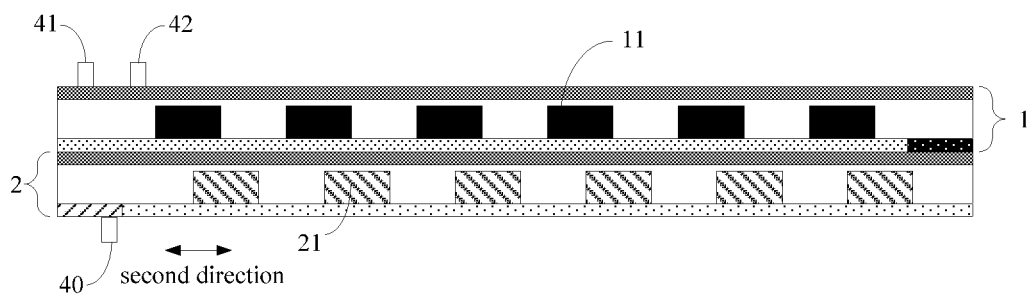
FIG. 22b is a schematic view of signal transmission when a second signal transmitter does not overlap with a third signal receiver and a fourth signal receiver.

As shown in FIGS. 22*a* and 22*b*, after the flexible display device is stretched and in the caser that the orthographic projection of the first signal transmitter 30 onto the main flexible display panel does not overlap with the first signal receiver 31 and the second signal receiver 32, the first signal receiver 31 and the second signal receiver 32 are unable to receive the first instruction signal and the second instruction signal transmitted by the first signal transmitter 30. In the case that the orthographic projection of the second signal transmitter 40 onto the main flexible display panel does not overlap with the third signal receiver 41 and the fourth signal receiver 42, the third signal receiver 41 and the fourth signal receiver 42 are unable to receive the third instruction signal and the fourth instruction signal transmitted by the second signal transmitter 40. The control circuit of the auxiliary flexible display panel is configured to control the auxiliary flexible display panel to be in a first display state. In the first display state, the orthographic projection of the auxiliary pixel unit onto the main flexible display panel overlaps with at least one main pixel unit, and the auxiliary pixel unit and the at least one main pixel unit have the same display gray scale.

Figure 23A:
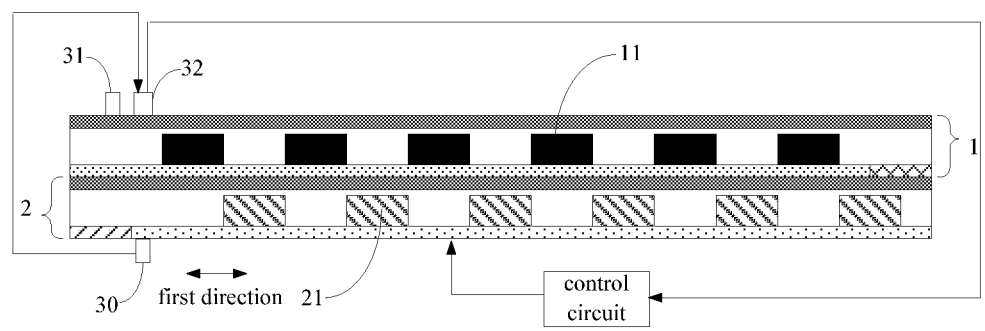
FIG. 23a is a schematic view of signal transmission when a first signal transmitter overlaps with a second signal receiver.
Figure 23B:
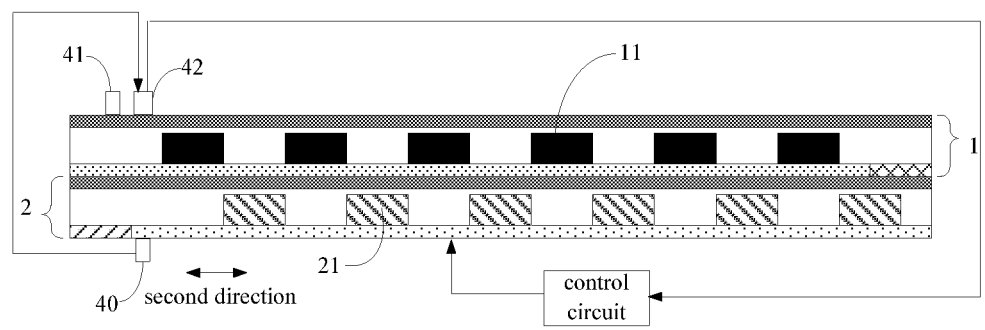
FIG. 23b is a schematic view of signal transmission when a second signal transmitter overlaps with a fourth signal receiver.

As shown in FIGS. 23*a* and 23*b*, the first signal transmitter 30 is further configured to transmit the second instruction signal in the case that the orthographic projection of the first signal transmitter 30 onto the main flexible display panel overlaps with the second signal receiver 32, and the second signal receiver 32 is configured to receive the second instruction signal sent by the first signal transmitter 30 and transmit the second instruction signal to the control circuit of the auxiliary flexible display panel. The second signal transmitter 40 is further configured to transmit the fourth instruction signal in the case that the orthographic projection of the second signal transmitter 40 onto the main flexible display panel overlaps with the fourth signal receiver 42, and the fourth signal receiver 42 is configured to receive the fourth instruction signal sent by the second signal transmitter 40 and transmit the fourth instruction signal to the control circuit of the auxiliary flexible display panel. The control circuit of the auxiliary flexible display panel is configured to control the auxiliary flexible display panel to be in a second display state in response to the second instruction signal and/or the fourth instruction signal, where in the second display state, the orthographic projection of the auxiliary pixel unit onto the main flexible display panel does not overlap with any one of the main pixel units, and the auxiliary pixel unit and the main pixel unit have the same or different display gray scales.

It should be noted that, in some embodiments of the present disclosure, only one signal transmitter and two signal receivers are arranged in the first direction, and one signal transmitter and two signal receivers are arranged along the second direction. The signal transmitters are all arranged on the auxiliary flexible display panel, and the signal receivers are all arranged on the main flexible display panel. It is conceivable that in practical applications, the signal transmitter may also be arranged on the main flexible display panel, and the signal receiver can be arranged on the auxiliary flexible display panel. Alternatively, it is also conceivable to provide two signal transmitters and one signal receiver in the first direction, and two signal transmitters and one signal receiver in the second direction, and the detailed description thereof is omitted herein.

A method for driving the above flexible display device is further provided in some embodiments of the present disclosure, including:

controlling the auxiliary flexible display panel to be in a display state, in the case that the orthographic projection of each auxiliary pixel unit of the auxiliary flexible display panel onto the main flexible display panel do not completely overlap with any one of the main pixel units of the main flexible display panel; otherwise, controlling the auxiliary flexible display panel to be in a non-display state.

When the flexible display device is in an actual application, before being stretched, as shown in FIG. 1, the orthographic projections of the plurality of auxiliary pixel units 21 onto the main flexible display panel 1 completely overlap with the plurality of main pixel units 11. When the flexible display device is in the display state, the main flexible display panel 1 is controlled to be in the display state, and the auxiliary flexible display panel 2 is controlled to be in the non-display state, thereby preventing the auxiliary flexible display panel 2 from interfering with the display of the main flexible display panel 1, to ensure that the flexible display device can achieve the normal display function.

As shown in FIGS. 2 and 3, after stretching the flexible display device, the plurality of main pixel units 11 on the main flexible display panel 1 and the plurality of auxiliary pixel units 21 on the auxiliary flexible display panel 2 are misaligned, so that the orthographic projections of the plurality of auxiliary pixel units 21 onto the main flexible display panel 1 do not completely overlap with the plurality of main pixel units 11, and the auxiliary flexible display 2 can be controlled to be in a display state, so that light emitted from the auxiliary flexible display panel 2 may be transmitted to the display side of the flexible display device through the light-transmitting region between the adjacent main pixel units 11, and the user may see the image displayed by the main flexible display panel 1 together with the auxiliary flexible display panel 2.

According to the above method, when the flexible display device is driven by the driving method of the flexible display device provided hereinabove, when the auxiliary pixel units are arranged at the light-transmitting region between two adjacent main pixel units, the auxiliary flexible display panel may be controlled to be in the display state, thereby increasing the number of pixel units per inch included in the flexible display device after being stretched and ensuring the display effect of the flexible display device.

Optionally, in the flexible display device in the above embodiments, orthographic projections of the plurality of auxiliary pixel units onto the main flexible display panel completely overlap with the plurality of main pixel units before the flexible display device is stretched. In the first direction, the main flexible display panel is provided with a first signal receiver and a second signal receiver, and the auxiliary flexible display panel is provided with a signal transmitter.

The step of controlling the auxiliary flexible display panel to be in the display state includes:

in the case that the flexible display device is stretched and the orthographic projection of the signal transmitter onto the main flexible display panel does not overlap with the first signal receiver and the second signal receiver, the control circuit of the auxiliary flexible display panel controlling the auxiliary flexible display panel to be in a first display state, where in the first display state, the orthographic projection of the auxiliary pixel unit onto the main flexible display panel overlaps with at least one main pixel unit, and the auxiliary pixel unit and the at least one main pixel unit have the same display gray scale;

in the case that the orthographic projection of the signal transmitter onto the main flexible display panel overlaps with the second signal receiver, the signal transmitter transmitting the second instruction signal, the second signal receiving the second instruction signal sent by the signal transmitter and transmitting the second instruction signal to the control circuit of the auxiliary flexible display panel, the control circuit of the auxiliary flexible display panel controlling the auxiliary flexible display panel to be in a second display state in response to the second instruction signal, where in the second display state, the orthographic projection of the auxiliary pixel unit onto the main flexible display panel does overlap with the main pixel unit, and the auxiliary pixel unit and the main pixel unit have the same or different display gray scales.

The step of controlling the auxiliary flexible display panel to be in the non-display state includes:

in the case that the orthographic projections of the auxiliary pixel units onto the main flexible display panel completely overlap with the main pixel units and an orthographic projection of the signal transmitter onto the main flexible display panel overlaps with the first signal receiver, the signal transmitter transmitting the first instruction signal, the first signal receiver receiving the first instruction signal sent by the signal transmitter and transmitting the first instruction signal to the control circuit of the auxiliary flexible display panel, and the control circuit of the auxiliary flexible display panel controlling the auxiliary flexible display panel to be in the non-display state in response to the first instruction signal.

Optionally, in the flexible display device provided in some embodiments, before the flexible display device is stretched, the orthographic projections of the plurality of auxiliary pixel units onto the main flexible display panel completely overlap with the plurality of main pixel units. In the first direction, a first signal receiver and a second signal receiver are arranged on the main flexible display panel, and a first signal transmitter is arranged on the auxiliary flexible display panel In the second direction, a third signal receiver and a fourth signal receiver are arranged on the main flexible display panel, and a second signal transmitter is arranged on the auxiliary flexible display panel.

The step of controlling the auxiliary flexible display panel to be in the display state includes:

in the case that the flexible display device is stretched and the orthographic projection of the first signal transmitter onto the main flexible display panel does not overlap with the first signal receiver and the second signal receiver and the orthographic projection of the second signal transmitter onto the main flexible display panel does not overlap with the third signal receiver and the fourth signal receiver, the control circuit of the auxiliary flexible display panel controlling the auxiliary flexible display panel to be in a first display state, where in the first display state, the orthographic projection of the auxiliary pixel unit onto the main flexible display panel overlaps with at least one main pixel unit, and the auxiliary pixel unit and the at least one main pixel unit have the same display gray scale;

in the case that the orthographic projection of the first signal transmitter onto the main flexible display panel overlaps with the second signal receiver, the first signal transmitter transmitting the second instruction signal, and the second signal receiving the second instruction signal sent by the first signal transmitter and transmitting the second instruction signal to the control circuit of the auxiliary flexible display panel; in the case that the orthographic projection of the second signal transmitter onto the main flexible display panel overlaps with the fourth signal receiver, the second signal transmitter transmitting the fourth instruction signal and the fourth signal receiver receiving the fourth instruction signal sent by the second signal transmitter and transmitting the fourth instruction signal to the control circuit of the auxiliary flexible display panel; the control circuit of the auxiliary flexible display panel controlling the auxiliary flexible display panel to be in a second display state in response to the second instruction signal and/or the fourth instruction signal, where in the second display state, the orthographic projection of the auxiliary pixel unit onto the main flexible display panel does not overlap with the main pixel unit, and the auxiliary pixel unit and the main pixel unit have the same or different display gray scales;

The step of controlling the auxiliary flexible display panel to be in a non-display state specifically includes:

before the flexible display device is stretched, in the case that the orthographic projections of the auxiliary pixel units onto the main flexible display panel completely overlap with the main pixel units and an orthographic projection of the first signal transmitter onto the main flexible display panel overlaps with the first signal receiver and an orthographic projection of the second signal transmitter onto the main flexible display panel overlaps with the third signal receiver, the first signal transmitter transmitting the first instruction signal and the first signal receiver receiving the first instruction signal sent by the first signal transmitter and transmit the first instruction signal to the control circuit of the auxiliary flexible display panel; the second signal transmitter transmitting the third instruction signal, the third signal receiver receiving the third instruction signal sent by the second signal transmitter and transmitting the third instruction signal to the control circuit of the auxiliary flexible display panel; and the control circuit of the auxiliary flexible display panel controlling the auxiliary flexible display panel to be in a non-display state in response to the first instruction signal and/or the third instruction signal.

It should be noted that the embodiments in the present specification are described in a progressive manner, and the same or similar parts between the various embodiments may be referred to each other, and each embodiment focuses on differences from other embodiments. In particular, for the method embodiment, since it is basically similar to the product embodiment, the description is relatively simple, and the relevant parts can be referred to the description of the product embodiment.

In the description of the above embodiments, specific features, structures, materials or features may be combined in any suitable manner in any one or more embodiments or examples.

The above are merely some embodiments of the present disclosure. A person skilled in the art may make further modifications and improvements without departing from the principle of the present disclosure, and these modifications and improvements shall also fall within the scope of the present disclosure. Therefore, the scope of the disclosure should be determined by the scope of the appended claims.

The invention claimed is:

1. A flexible display device, comprising: a main flexible display panel and at least one auxiliary flexible display panel stacked on the main flexible display panel, wherein:
    the main flexible display panel comprises a plurality of main pixel units spaced apart from each other, the auxiliary flexible display panel comprises a plurality of auxiliary pixel units spaced apart from each other, and orthographic projections of the auxiliary pixel units onto the main flexible display panel overlap with the main pixel units;
    the main flexible display panel is configured to, in the case that the flexible display device is stretched, enable at least a part of an orthographic projection of each main pixel unit of the main flexible display panel onto the auxiliary flexible display panel to be arranged between two adjacent auxiliary pixel units of the auxiliary flexible display panel, and/or
    the auxiliary flexible display panel is configured to, in the case that the flexible display device is stretched, enable at least a part of an orthographic projection of each auxiliary pixel unit of the auxiliary flexible display panel onto the main flexible display panel to be arranged between two adjacent main pixel units of the main flexible display panel.

2. The flexible display device according to claim 1, wherein at least one of a main base substrate of the main flexible display panel and an auxiliary base substrate of the auxiliary flexible display panel has different elasticity moduli.

3. The flexible display device according to claim 2, wherein the main base substrate comprises at least two sub substrates spliced together in a first direction and having different elasticity moduli, and/or the auxiliary base substrate comprises at least two sub substrates spliced together in a second direction and having different elasticity moduli, wherein the first direction is perpendicular to the second direction.

4. The flexible display device according to claim 3, wherein a splicing seam between the sub substrates of the main base substrate and a splicing seam between the sub substrates of the auxiliary base substrate are both arranged at a non-display region of the flexible display device.

5. The flexible display device according to claim 1, wherein:
the main flexible display panel is arranged at a display side of the auxiliary flexible display panel, and the auxiliary flexible display panel is configured to be switched between a non-display state and a display state;
in the case that at least a part of the orthographic projection of each auxiliary pixel unit of the auxiliary flexible display panel onto the main flexible display panel is arranged between two adjacent main pixel units of the main flexible display panel, the auxiliary flexible display panel is in the display state;
in the case that the orthographic projection of each auxiliary pixel unit of the auxiliary flexible display panel onto the main flexible display panel is arranged within each main pixel unit of the main flexible display panel, the auxiliary flexible display panel is in the non-display state; and
a light transmitting region is arranged between two adjacent main pixel units of the main flexible display panel.

6. The flexible display device according to claim 5, wherein in the case that an overlapping area of the orthographic projection of each auxiliary pixel unit of the auxiliary flexible display panel onto the main flexible display panel and the main pixel unit is less than or equal to a half of an area of the auxiliary pixel unit, the auxiliary flexible display panel is in the display state; in the case that the overlapping area of the orthographic projection of each auxiliary pixel unit of the auxiliary flexible display panel onto the main flexible display panel and the main pixel unit is greater than a half of the area of the auxiliary pixel unit, the auxiliary flexible display panel is in the non-display state.

7. The flexible display device according to claim 3, wherein:
the main base substrate of the main flexible display panel comprises a first main sub substrate and a second main sub substrate spliced together in the first direction, and the auxiliary base substrate of the auxiliary flexible display panel comprises a first auxiliary sub substrate and a second auxiliary sub substrate spliced together in the first direction; and
a splicing seam between the first main sub substrate and the second main sub substrate and a splicing seam between the first auxiliary sub substrate and the second auxiliary sub substrate are respectively arranged at two opposite sides of the flexible display device in the first direction.

8. The flexible display device according to claim 3, wherein the main base substrate of the main flexible display panel comprises a first main sub substrate and a second main sub substrate spliced together in the first direction, and/or the auxiliary base substrate of the auxiliary flexible display panel comprises a first auxiliary sub substrate and a second auxiliary sub substrate spliced together in the first direction.

9. The flexible display device according to claim 7, wherein:
the main base substrate of the main flexible display panel further comprises a third main sub substrate spliced together with the first main sub substrate and the second main sub substrate in the second direction;
the auxiliary base substrate of the auxiliary flexible display panel further comprises a third auxiliary sub substrate spliced together with the first auxiliary sub substrate and the second auxiliary sub substrate in the second direction; and
a splicing seam between the third main sub substrate and the first main sub substrate and the second main sub substrate and a splicing seam between the third auxiliary sub substrate and the first auxiliary sub substrate and the second auxiliary sub substrate are respectively arranged at two opposite sides of the flexible display device in second first direction.

10. The flexible display device according to claim 3, wherein:
the main base substrate of the main flexible display panel comprises: a first main sub substrate and a second main sub substrate spliced together in the first direction and a third main sub substrate spliced together with the first main sub substrate and the second main sub substrate in the second direction; or
the auxiliary base substrate of the auxiliary flexible display panel comprises: a first auxiliary sub substrate and a second auxiliary sub substrate spliced together in the first direction and a third auxiliary sub substrate spliced together with the first auxiliary sub substrate and the second auxiliary sub substrate in the second direction.

11. The flexible display device according to claim 3, wherein:
the main base substrate of the main flexible display panel comprises: a first main sub substrate and a second main sub substrate spliced together in the first direction and a third main sub substrate spliced together with the first main sub substrate and the second main sub substrate in the second direction; and
the auxiliary base substrate of the auxiliary flexible display panel comprises: a first auxiliary sub substrate and a second auxiliary sub substrate spliced together in the first direction; or
the auxiliary base substrate of the auxiliary flexible display panel comprises: a second auxiliary sub substrate and a third auxiliary sub substrate spliced together in the second direction.

12. The flexible display device according to claim 3, wherein:
the auxiliary base substrate of the auxiliary flexible display panel comprises: a first auxiliary sub substrate and a second auxiliary sub substrate spliced together in the first direction and a third auxiliary sub substrate spliced together with the first auxiliary sub substrate and the second auxiliary sub substrate in the second direction; and
the main base substrate of the main flexible display panel comprises: a first main sub substrate and a second main sub substrate spliced together in the first direction; or
the main base substrate of the main flexible display panel comprises: a first main sub substrate and a third main sub substrate spliced together in the second direction.

13. The flexible display device according to claim 3, wherein:
the main base substrate of the main flexible display panel comprises: a first main sub substrate and a second main sub substrate spliced together in the first direction; and
the auxiliary base substrate of the auxiliary flexible display panel comprises: a second auxiliary sub substrate and a third auxiliary sub substrate spliced together in the second direction.

14. The flexible display device according to claim 7, wherein:

a first signal receiver and a second signal receiver are arranged on the main flexible display panel in the first direction, and a signal transmitter is arranged on the auxiliary flexible display panel, wherein the signal transmitter is configured to transmit a first instruction signal and a second instruction signal, the first signal receiver is configured to receive the first instruction signal, and the second signal receiver is configured to receive the second instruction signal;

the signal transmitter is configured to transmit the first instruction signal in the case that the orthographic projections of the auxiliary pixel units onto the main flexible display panel completely overlap with the main pixel units and an orthographic projection of the signal transmitter onto the main flexible display panel overlaps with the first signal receiver; the first signal receiver is configured to receive the first instruction signal sent by the signal transmitter and transmit the first instruction signal to a control circuit of the auxiliary flexible display panel; the control circuit of the auxiliary flexible display panel is configured to control the auxiliary flexible display panel to be in a non-display state in response to the first instruction signal;

in the case that the flexible display device is stretched and the orthographic projection of the signal transmitter onto the main flexible display panel does not overlap with the first signal receiver and the second signal receiver, the first signal receiver and the second signal receiver are unable to receive the first instruction signal and the second instruction signal transmitted by the signal transmitter; the control circuit of the auxiliary flexible display panel is configured to control the auxiliary flexible display panel to be in a first display state, wherein in the first display state, the orthographic projection of the auxiliary pixel unit onto the main flexible display panel overlaps with at least one main pixel unit, and the auxiliary pixel unit and the at least one main pixel unit have the same display gray scale; and the signal transmitter is further configured to transmit the second instruction signal in the case that the orthographic projection of the signal transmitter onto the main flexible display panel overlaps with the second signal receiver; the second signal receiver is configured to receive the second instruction signal sent by the signal transmitter and transmit the second instruction signal to the control circuit of the auxiliary flexible display panel; the control circuit of the auxiliary flexible display panel is configured to control the auxiliary flexible display panel to be in a second display state in response to the second instruction signal, wherein in the second display state, the orthographic projection of the auxiliary pixel unit onto the main flexible display panel does not overlap with the main pixel unit, and the auxiliary pixel unit and the main pixel unit have the same or different display gray scales.

15. The flexible display device according to claim 9, wherein:

a first signal receiver and a second signal receiver are arranged on the main flexible display panel in the first direction, and a first signal transmitter is arranged on the auxiliary flexible display panel; a third signal receiver and a fourth signal receiver are arranged on the main flexible display panel in the second direction, and a second signal transmitter is arranged on the auxiliary flexible display panel, wherein the first signal transmitter is configured to transmit a first instruction signal and a second instruction signal and the second signal transmitter is configured to transmit a third instruction signal and a fourth instruction signal; the first signal receiver is configured to receive the first instruction signal, the second signal receiver is configured to receive the second instruction signal, the third signal receiver is configured to receive the third instruction signal, and the fourth signal receiver is configured to receive the fourth instruction signal;

the first signal transmitter is configured to transmit the first instruction signal in the case that the orthographic projections of the auxiliary pixel units onto the main flexible display panel completely overlap with the main pixel units and an orthographic projection of the first signal transmitter onto the main flexible display panel overlaps with the first signal receiver; the second signal transmitter is configured to transmit the third instruction signal in the case that the orthographic projections of the auxiliary pixel units onto the main flexible display panel completely overlap with the main pixel units and an orthographic projection of the second signal transmitter onto the main flexible display panel overlaps with the third signal receiver; the first signal receiver is configured to receive the first instruction signal sent by the first signal transmitter and transmit the first instruction signal to a control circuit of the auxiliary flexible display panel, and the third signal receiver is configured to receive a third instruction signal sent by the second signal transmitter and transmit the third instruction signal to the control circuit of the auxiliary flexible display panel; the control circuit of the auxiliary flexible display panel is configured to control the auxiliary flexible display panel to be in a non-display state in response to the first instruction signal and/or the third instruction signal;

in the case that the flexible display device is stretched and the orthographic projection of the first signal transmitter onto the main flexible display panel does not overlap with the first signal receiver and the second signal receiver, the first signal receiver and the second signal receiver are unable to receive the first instruction signal and the second instruction signal transmitted by the first signal transmitter; in the case that the orthographic projection of the second signal transmitter onto the main flexible display panel does not overlap with the third signal receiver and the fourth signal receiver, the third signal receiver and the fourth signal receiver are unable to receive the third instruction signal and the fourth instruction signal transmitted by the second signal transmitter; the control circuit of the auxiliary flexible display panel is configured to control the auxiliary flexible display panel to be in a first display state, wherein in the first display state, the orthographic projection of the auxiliary pixel unit onto the main flexible display panel overlaps with at least one main pixel unit, and the auxiliary pixel unit and the at least one main pixel unit have the same display gray scale; and the first signal transmitter is further configured to transmit the second instruction signal in the case that the orthographic projection of the first signal transmitter onto the main flexible display panel overlaps with the second signal receiver, and the second signal receiver is configured to receive the second instruction signal sent by the first signal transmitter and transmit the second instruction signal to the control circuit of the auxiliary flexible display panel; the second signal transmitter is further configured to transmit the fourth instruction signal in the case that the orthographic projection of the second signal transmitter onto the main flexible display panel overlaps with the fourth signal receiver, and the fourth signal receiver is configured to receive the fourth instruction signal sent by the second signal transmitter and transmit the fourth instruction signal to the control circuit of the auxiliary flexible display panel; the control circuit of the auxiliary flexible display panel is configured to control the auxiliary flexible display panel to be in a second display state in response to the second instruction signal and/or the fourth instruction signal, wherein in the second display state, the orthographic projection of the auxiliary pixel unit onto the main flexible display panel does overlap with the main pixel unit, and the auxiliary pixel unit and the main pixel unit have the same or different display gray scales.

16. A method for driving a flexible display device, wherein the flexible display device comprises:
- a main flexible display panel and at least one auxiliary flexible display panel stacked on the main flexible display panel, wherein:
  - the main flexible display panel comprises a plurality of main pixel units spaced apart from each other, the auxiliary flexible display panel comprises a plurality of auxiliary pixel units spaced apart from each other, and orthographic projections of the auxiliary pixel units onto the main flexible display panel overlap with the main pixel units;
  - the main flexible display panel is configured to, in the case that the flexible display device is stretched, enable at least a part of an orthographic projection of each main pixel unit of the main flexible display panel onto the auxiliary flexible display panel to be arranged between two adjacent auxiliary pixel units of the auxiliary flexible display panel, and/or
  - the auxiliary flexible display panel is configured to, in the case that the flexible display device is stretched, enable at least a part of an orthographic projection of each auxiliary pixel unit of the auxiliary flexible display panel onto the main flexible display panel to be arranged between two adjacent main pixel units of the main flexible display panel;

wherein the method comprises:
controlling the auxiliary flexible display panel to be in a display state, in the case that at least a part of the orthographic projection of each auxiliary pixel unit of the auxiliary flexible display panel onto the main flexible display panel is arranged between two adjacent main pixel units of the main flexible display panel;
controlling the auxiliary flexible display panel to be in a non-display state, in the case that the orthographic projection of each auxiliary pixel unit of the auxiliary flexible display panel onto the main flexible display panel is arranged within each main pixel unit of the main flexible display panel.

\* \* \* \* \*